US011605961B2

(12) United States Patent
Towner et al.

(10) Patent No.: US 11,605,961 B2
(45) Date of Patent: Mar. 14, 2023

(54) SYSTEM FOR FACILITATING THE CHARGING OF A BATTERY-OPERATED APPARATUS

(71) Applicant: ECHO INCORPORATED, Lake Zurich, IL (US)

(72) Inventors: Stephen J. Towner, Gurnee, IL (US); Ryan Garrett, Buffalo Grove, IL (US); Joseph John Zenkus, Lake in the Hills, IL (US); Brent Peterson, Buffalo Grove, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 695 days.

(21) Appl. No.: 16/682,470

(22) Filed: Nov. 13, 2019

(65) Prior Publication Data

US 2021/0083492 A1 Mar. 18, 2021

Related U.S. Application Data

(60) Provisional application No. 62/899,865, filed on Sep. 13, 2019.

(51) Int. Cl.
*H02J 7/00* (2006.01)
*A01D 34/00* (2006.01)
(Continued)

(52) U.S. Cl.
CPC .......... *H02J 7/0045* (2013.01); *A01D 34/008* (2013.01); *B60L 53/10* (2019.02);
(Continued)

(58) Field of Classification Search
CPC ........ H02J 7/0045; B60L 53/35; B60L 53/15; B60L 53/10; B60L 53/30; A01D 34/00; A01D 2101/00
(Continued)

(56) References Cited

U.S. PATENT DOCUMENTS 4,180,964 A 1/1980 Pansire
4,694,639 A 9/1987 Chen et al.
(Continued)

FOREIGN PATENT DOCUMENTS

EP 2656718 A1 10/2013

*Primary Examiner* — Mahmoud Gimie
(74) *Attorney, Agent, or Firm* — Wood, Phillips, Katz, Clark & Mortimer

(57) ABSTRACT

An adjustable system for facilitating establishment of an operative connection between a charging station and a rechargeable power supply on an operating unit that is propelled by a drive. The adjustable system has: an arm assembly on one of the charging station and the operating unit and supporting at least one connector; and at least one connector on the other of the charging station and the operating unit. The connectors, when engaged, establish an operative charging connection. The arm assembly is configured so that the at least one connector on the arm assembly can move in at least two dimensions relative to the one of the charging station and the operating unit to align with and engage the at least one connector on the other of the arm assembly and operating unit as an incident of the operating unit moving from a position spaced fully from the charging station into the charging position.

19 Claims, 16 Drawing Sheets

(51) Int. Cl.
   *B60L 53/16*  (2019.01)
   *B60L 53/30*  (2019.01)
   *B60L 53/35*  (2019.01)
   *B60L 53/10*  (2019.01)
   *A01D 101/00*  (2006.01)

(52) U.S. Cl.
   CPC .............. *B60L 53/16* (2019.02); *B60L 53/30* (2019.02); *B60L 53/35* (2019.02); *A01D 2101/00* (2013.01)

(58) Field of Classification Search
   USPC ........................................................ 320/107
   See application file for complete search history.

(56) References Cited

U.S. PATENT DOCUMENTS

| | | |
|---|---|---|
| 5,204,814 A | 4/1993 | Noonan et al. |
| 5,323,593 A | 6/1994 | Cline et al. |
| 5,911,670 A | 6/1999 | Angott et al. |
| 5,974,347 A | 10/1999 | Nelson |
| D451,931 S | 12/2001 | Abramson et al. |
| 6,525,509 B1 | 2/2003 | Petersson et al. |
| 7,613,552 B2 | 11/2009 | Bemini |
| 7,668,631 B2 | 2/2010 | Bemini |
| 7,729,801 B2 | 6/2010 | Abramson |
| 8,027,761 B1 | 9/2011 | Nelson |
| 8,234,848 B2 | 8/2012 | Messina et al. |
| 8,336,282 B2 | 12/2012 | Messina et al. |
| 8,352,113 B2 | 1/2013 | Johnson et al. |
| 8,352,114 B2 | 1/2013 | More et al. |
| 8,392,044 B2 | 3/2013 | Thompson et al. |
| 8,433,468 B2 | 4/2013 | Johnson et al. |
| 8,476,867 B2 | 7/2013 | Li et al. |
| 8,549,826 B2 | 10/2013 | Kraft et al. |
| 8,618,766 B2 | 12/2013 | Anderson et al. |
| 8,634,960 B2 | 1/2014 | Sandin et al. |
| 8,781,627 B2 | 7/2014 | Sandin et al. |
| 8,868,237 B2 | 10/2014 | Sandin et al. |
| 8,930,024 B2 | 1/2015 | Abramson |
| 8,954,193 B2 | 2/2015 | Sandin et al. |
| 9,043,952 B2 | 6/2015 | Sandin et al. |
| 9,043,953 B2 | 6/2015 | Sandin et al. |
| 9,072,219 B2 | 7/2015 | Da Rocha et al. |
| 9,119,341 B2 | 9/2015 | Jägenstedt |
| 9,237,689 B2 | 1/2016 | Choi et al. |
| 9,276,419 B2 | 3/2016 | Borinato et al. |
| 9,357,699 B2 | 6/2016 | Elonsson |
| 9,376,027 B2 | 6/2016 | Harris |
| D760,649 S | 7/2016 | Cmich et al. |
| D760,806 S | 7/2016 | Cmich et al. |
| 9,405,294 B2 | 8/2016 | Jägenstedt et al. |
| 9,419,453 B2 | 8/2016 | Andersson et al. |
| 9,420,741 B2 | 8/2016 | Balutis et al. |
| 9,429,950 B2 | 8/2016 | Sjöholm |
| 9,440,350 B2 | 9/2016 | Mou et al. |
| 9,471,063 B2 | 10/2016 | Ouyang |
| D776,054 S | 1/2017 | Cmich et al. |
| D776,169 S | 1/2017 | Cmich et al. |
| 9,538,702 B2 | 1/2017 | Balutis et al. |
| 9,563,204 B2 | 2/2017 | Willgert |
| D781,926 S | 3/2017 | Al-Hashimi et al. |
| 9,606,541 B2 | 3/2017 | Abramson |
| 9,713,302 B2 | 7/2017 | Sandin et al. |
| 9,740,210 B2 | 8/2017 | Sjöholm |
| D796,555 S | 9/2017 | Landberg et al. |
| 9,788,481 B2 | 10/2017 | Das et al. |
| 9,807,930 B1 | 11/2017 | Lydon et al. |
| 9,853,468 B2 | 12/2017 | Ireland |
| 2009/0183478 A1* | 7/2009 | Bernini ................ A01B 69/008 901/1 |
| 2012/0029752 A1 | 2/2012 | Johnson et al. |
| 2012/0029755 A1 | 2/2012 | Johnson |
| 2012/0290165 A1 | 11/2012 | Ouyang |
| 2014/0000231 A1 | 1/2014 | Bemini |
| 2014/0327389 A1* | 11/2014 | Elonsson .............. H02J 7/0042 901/1 |
| 2016/0113195 A1 | 4/2016 | Das et al. |
| 2016/0128275 A1 | 5/2016 | Johnson |
| 2016/0332526 A1* | 11/2016 | Svensson ................ B60L 1/003 |
| 2017/0079202 A1 | 3/2017 | Balutis et al. |
| 2017/0129297 A1 | 5/2017 | Björn et al. |
| 2017/0139419 A1 | 5/2017 | Jägenstedt et al. |
| 2017/0150676 A1 | 6/2017 | Yamauchi et al. |
| 2017/0215336 A1 | 8/2017 | Andriolo et al. |
| 2017/0282735 A1 | 10/2017 | Yamamura et al. |
| 2017/0322562 A1 | 11/2017 | Churavy et al. |

\* cited by examiner

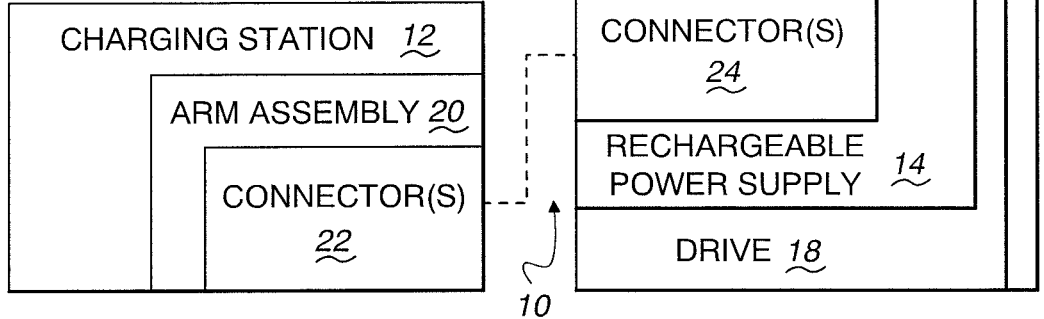
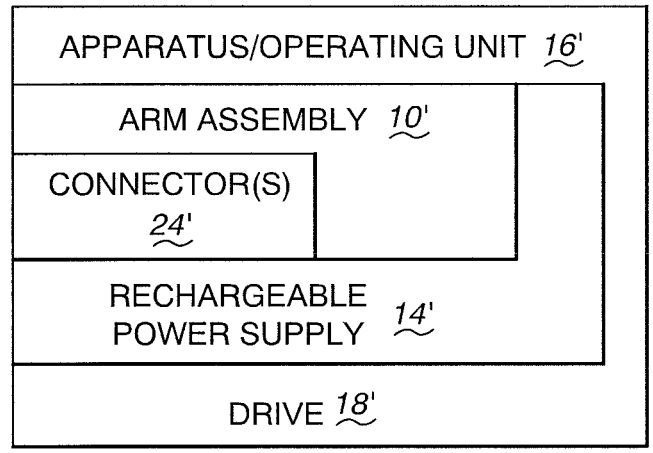
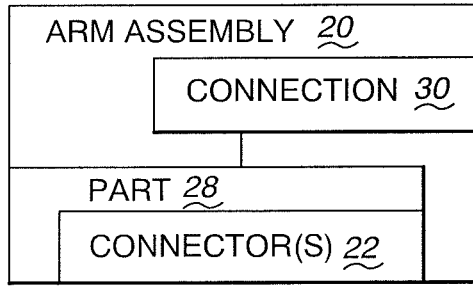
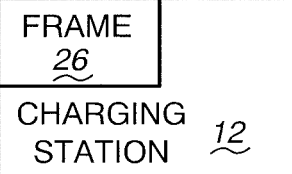
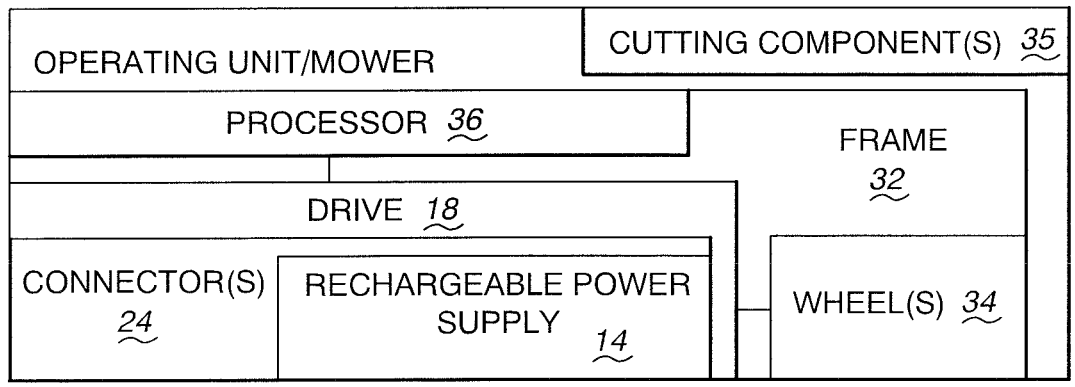

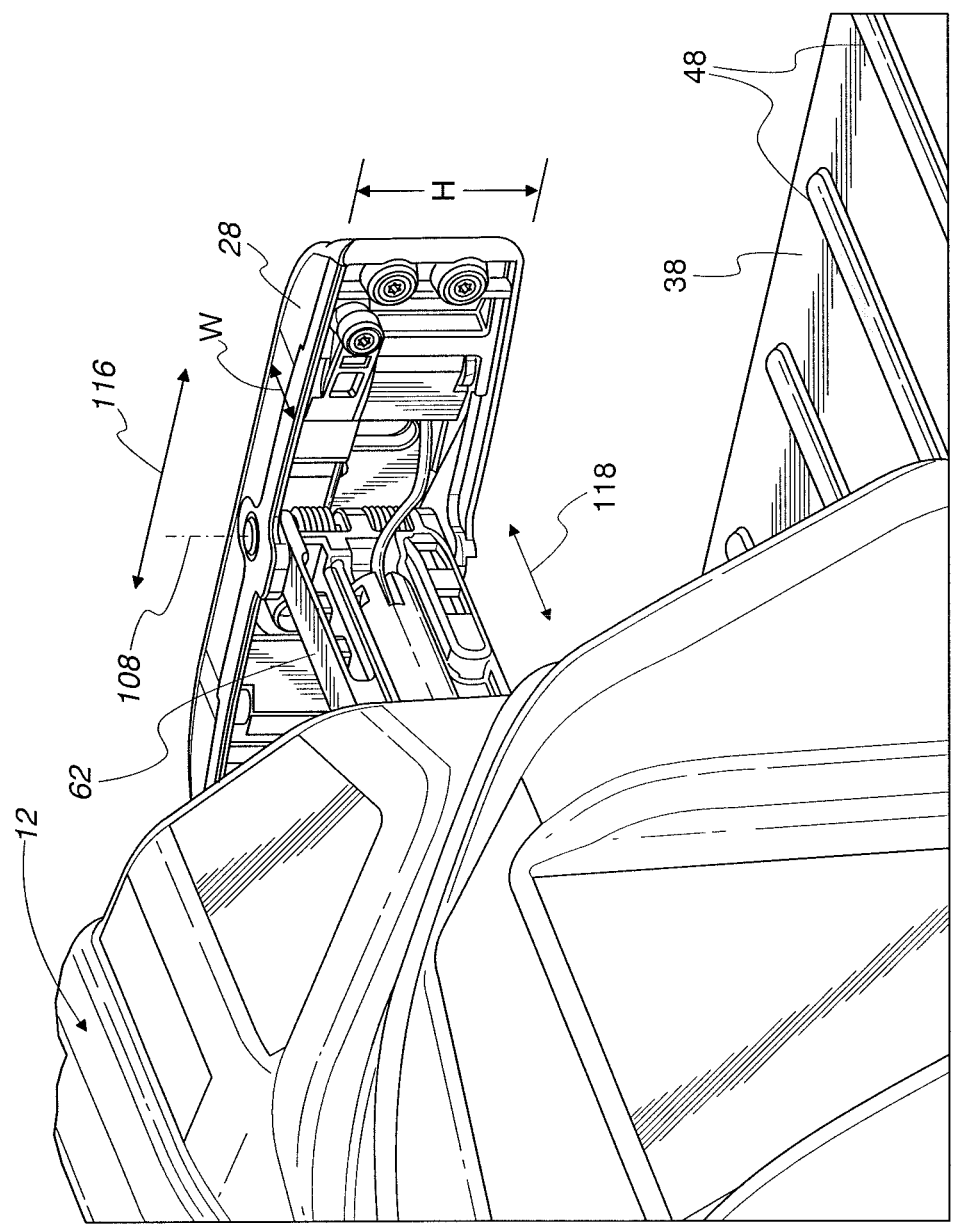

SYSTEM FOR FACILITATING THE CHARGING OF A BATTERY-OPERATED APPARATUS

BACKGROUND OF THE INVENTION

Field of the Invention

This invention relates to battery-operated apparatus and, more particularly, to a system that facilitates charging of a battery for the apparatus at a charging station.

Background Art

More and more apparatus are being operated by rechargeable power supplies/batteries. These apparatus are wide-ranging in terms of their function and the environments in which they are used.

Batteries are recharged in many different ways. In one form, a charging cord is plugged into the apparatus with the battery/batteries in place thereon. In another form, batteries are removed from the apparatus to be charged, after which the batteries are reconnected to the apparatus.

One category of battery-operated apparatus is self-propelled. The batteries are commonly recharged with this type of apparatus by advancing the apparatus into a charging position with respect to a docking/charging station. The apparatus and docking station may be configured so that as an incident of the apparatus realizing the charging position, the batteries and docking station become electrically coupled to allow charging to occur.

The apparatus may be maneuvered relative to the docking station in different manners. As an alternative to causing the apparatus to move under its own power in relationship to the docketing station, the apparatus may be manually guided towards the docking station and into the charging position.

More commonly, the self-propelled apparatus are constructed to navigate through a GPS-based system or may utilize operating signals from a dedicated generator. The system can be programmed to guide the apparatus automatically to the charging position, which may also be a default position that the apparatus assumes.

This latter category of apparatus is used in different environments. As just one example, residential "robotic" vacuum cleaners are commonly being used and programmed to navigate over a prescribed course and return to a docking station for storage and charging.

Similar technology, which may use dedicated signal generators or GPS, is now used in the landscaping industry. Battery-operated lawn mowers are currently being used on private properties and at public locations, such as golf courses.

Charging of robotic lawn mowers introduces additional challenges. First of all, the docking/charging stations are commonly isolated outside of buildings with direct exposure to rain and other environmental conditions and hazards. Thus, steps must be taken in design to avoid damage to the components, shorting of connections in wet conditions, etc., which result in down time that may have significant economic consequences, particularly in the golf industry.

Another challenge created by this application is the establishment of a relationship between the apparatus and docking station whereby the apparatus can be consistently guided into, and maintained in, its charging position. A user may wish to effect charging at more than one location, particularly when large expanses are being treated, such as on a golf course. The flexibility of this model is maximized when permanent platforms need not be constructed to accommodate the docking station. As a result, the docking station may be placed on uneven terrain which introduces larger tolerance requirements to match electrical components between the docking station and the apparatus when in the charging position.

Still further, even if a platform is incorporated into a docking station that would allow the consistent alignment between the cooperating connecting/charging components on the docking station and apparatus, environmental conditions may introduce other variables.

For example, windy conditions may direct leaves, grass, and other debris onto the platform, thereby effectively elevating some or all of the platform surface contacted by the wheel or wheels on the apparatus so that the apparatus assumes a position tilted or skewed from the preselected charging position.

Similarly, debris may be picked up by the apparatus as it is maneuvering during the cutting operation. As just an example, in wet conditions, compacted soil may accumulate on one or more wheels, which may be complicated by adherence of foreign matter to the soil. As a result, the effective diameter of one or more of the wheels may be changed whereby upon engaging the platform, a different vertical and/or angular relationship exists between part or all of the apparatus and the docking station.

The alignment of the cooperating electrical and mechanical components on the charging station and apparatus may be further affected by a change in the subjacent surface against which the apparatus acts as it moves to and from its charging position. In many locations on golf courses, soil conditions may be relatively soft—if not under dry conditions, when precipitation levels are high. As a result, even light grass cutting apparatus tend to create ruts, particularly in those repetitively traveled path portions where the apparatus advances into its charging position and moves away therefrom. Precision navigation control typically causes each of the wheels to move in substantially the same path in the vicinity of the charger whereupon there is a progressive erosion of the soil and generation of tracks that may change the relationship between the apparatus and the charging station. In a worst case, the ruts and soil reconfiguration may block movement of the apparatus into its charging position. A less severe ground condition may nonetheless cause binding between the apparatus and charging station and potentially less than positive engagement between connectors thereon, depending upon the particular construction. Use of a platform may alleviate this problem to a certain extent. However, ground conditions may be such as to impair transitioning of the apparatus wheels from the bare ground to the supporting platform surface.

Accordingly, tolerances must be accommodated to allow the docking station and/or the apparatus to self-adjust to allow the cooperating electrical components/connectors thereon to interact with the apparatus in the charging position to allow charging to consistently and reliably take place.

Even if environmental conditions are ideal, precise and consistent alignment between the apparatus and docking station may not always be possible and thus it may be necessary to allow charging to occur even though the apparatus may assume slightly different or skewed charging positions.

At the same time, there must be sufficient rigidity in design that the cooperating electrical components will positively and consistently engage as the charging position for the particular apparatus is assumed and remain engaged over the time period required for charging.

Still further, the cooperating components on the charging station and apparatus must be sufficiently durable that they can withstand repeated connection and disconnection without becoming damaged or misaligned.

Yet another consideration in the design is to meet regulatory guidelines, such as those set forth by organizations involved in product safety and testing certification, such as Underwriters Laboratories. Some regulations may be mandatory, whereas obtaining non-mandatory safety certification assists product promotion and reduces likelihood of liability for damages attributable to design.

Designers of the above types of systems must take into account all of the above issues to maximize charging efficiency and reliability. Since many of the above objectives are competing in nature, the design challenge is heightened. The industry continues to seek out alternative designs that better address each of the above areas.

SUMMARY OF THE INVENTION

In one form, the invention is directed to an adjustable system for facilitating establishment of an operative connection between a charging station and a rechargeable power supply on an operating unit that is propelled by a drive, powered by the rechargeable power supply, as to move in a controlled manner over a subjacent surface. The adjustable system includes: an arm assembly on one of the charging station and the operating unit and supporting at least one connector; and at least one connector on the other of the charging station and the operating unit. The at least one connector on the arm assembly and the at least one connector on the other of the charging station and the operating unit are configured to cooperate and establish an operative connection between the charging station and the operating unit with the at least one connector on the arm assembly and the at least one connector on the other of the charging station and the operating unit in an engaged relationship. With the connectors in this engaged relationship, the charging station and rechargeable power supply are operatively connected and the charging station is operable to effect charging of the rechargeable power supply. The operating unit is movable relative to the charging station from a position spaced fully from the charging station into a charging position wherein the at least one connector on the arm assembly and the at least one connector on the other of the charging station and the operating unit assume the engaged relationship. The arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position, spaced fully from the charging station, into the charging position.

In one form, the one of the charging station and the operating unit has a frame. The adjustable system has an arm base on the frame. The arm assembly has a support assembly for the one connector on the arm assembly. The support assembly is connected to the arm base for movement in at least two dimensions relative to the arm base.

In one form, the one of the charging station and the operating unit has a frame. The adjustable system has an arm base on the frame. The arm assembly has a support assembly for the one connector on the arm assembly. The support assembly is connected to the arm base for universal movement relative to the arm base.

In one form, the one of the charging station and the operating unit has a frame. The adjustable system has an arm base on the frame. The arm assembly has a support assembly for the one connector on the arm assembly. The support assembly is connected to the arm base through at least one deformable component that maintains the support assembly in a neutral state with no external forces applied to the support assembly and that deforms under a predetermined force applied to the support assembly to allow the one connector on the arm assembly to move in at least two dimensions relative to the arm base.

In one form, the at least one deformable component is a coil spring with axial ends connected one each to the arm base and the support assembly.

In one form, the support assembly is supported on the arm base by only the at least one deformable component.

In one form, the support assembly has a first arm part. The at least one deformable component connects between the first arm part and the arm base. At least one other arm part is movable relative to the first arm part to allow the one connector on the arm assembly to move relative to the first arm part.

In one form, the at least one other arm part is a second arm part movable relative to the first arm part and a third arm part, on which the one connector on the arm assembly is supported in a manner to move relative to the second arm part.

In one form, the second arm part is movable relative to the first arm part around a first axis.

In one form, the third arm part is movable relative to the second arm part around a second axis.

In one form, the first and second axes are substantially parallel to each other.

In one form, the one deformable component is a coil spring with a third axis. The third axis extends in a substantially horizontal line. At least one of the first and second axes extends in a substantially vertical line.

In one form, the first and second arm parts are biased into a neutral relationship with respect to each other around the first axis.

In one form, second and third arm parts are biased into a neutral relationship with respect to each other around the second axis.

In one form, the third arm part has an elongate slot with a length extending generally horizontally. The at least one connector on the arm assembly is located at least partially within the slot. The one connector on the other of the charging station and the operating unit is configured to move guidingly along the length of the slot to engage the one connector on the arm assembly as an incident of the operating unit moving relative to the charging station from a position spaced from the charging station into the charging position.

In one form, the arm base is movable relative to the frame on the one of the charging station and the operating unit and fixable in a plurality of vertically spaced positions on the frame on the one of the charging station and the operating unit.

In one form, the at least one deformable component consists of at least three deformable components each with an axis. The axes of the three deformable components are substantially parallel. The at least three deformable components are first and second deformable components spaced horizontally from each other and a third deformable component located above and horizontally between the first and second deformable components as viewed along the axes of the three deformable components.

In one form, the operating unit is a wheeled unit with at least one cutting element for severing grass.

In one form, the arm assembly is on the charging station.

In one form, the second arm part projects in cantilever fashion from the first arm part. The third arm part is supported entirely by the second arm part.

BRIEF DESCRIPTION OF THE DRAWINGS

FIG. 1 is a schematic representation of an adjustable system, according to the invention, for facilitating operative connection between a charging station and a rechargeable power supply on an apparatus/operating unit;

FIG. 2 is a schematic representation showing additional details of the apparatus/operating unit in FIG. 1;

FIG. 3 is schematic representation showing further details of the adjustable system in FIG. 1;

FIG. 4 is a schematic representation showing further details of the apparatus/operating unit in FIG. 1;

FIG. 12 is an enlarged, fragmentary, perspective view of the structure in FIG. 11 in place on the charging station;

DETAILED DESCRIPTION OF THE PREFERRED EMBODIMENT

Figure 5:
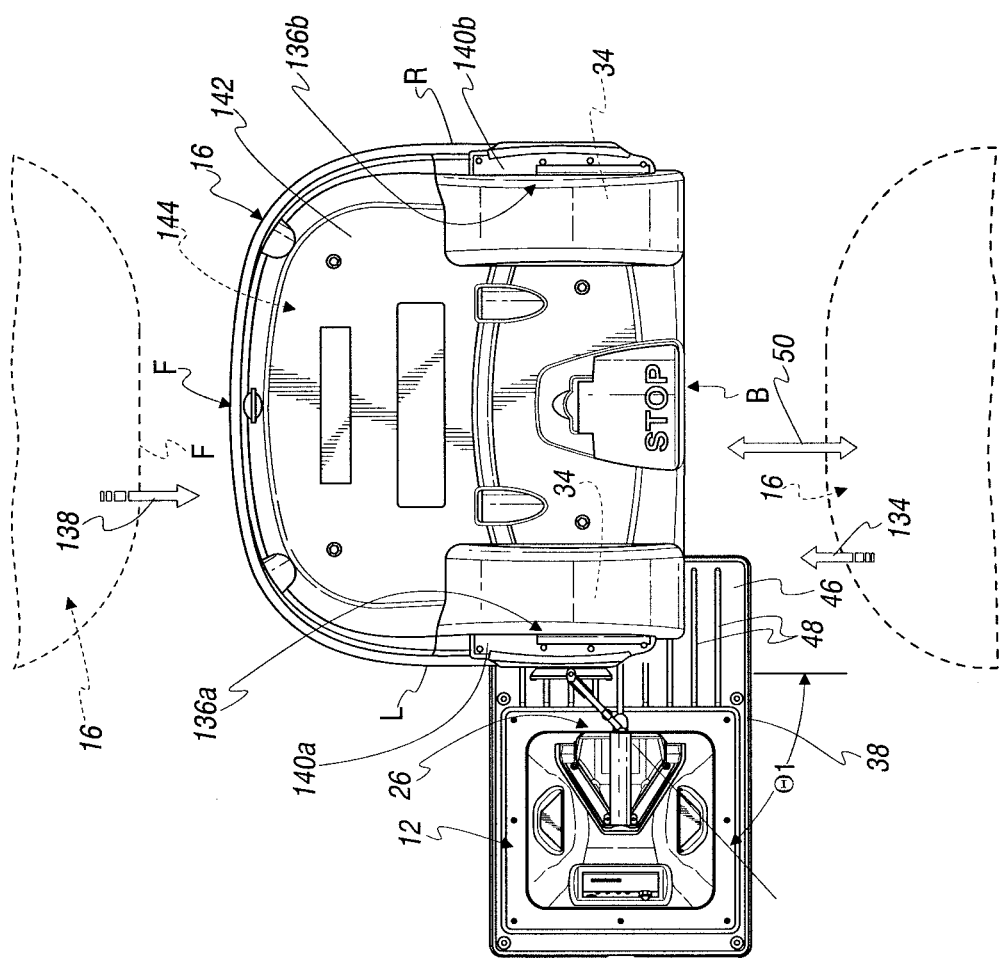
FIG. 5 is a plan view of specific forms of the adjustable system, the charging station, and the apparatus/operating unit shown schematically in FIG. 1, with the apparatus/operating unit in the form of a grass mower and in a charging position.
Figure 6:
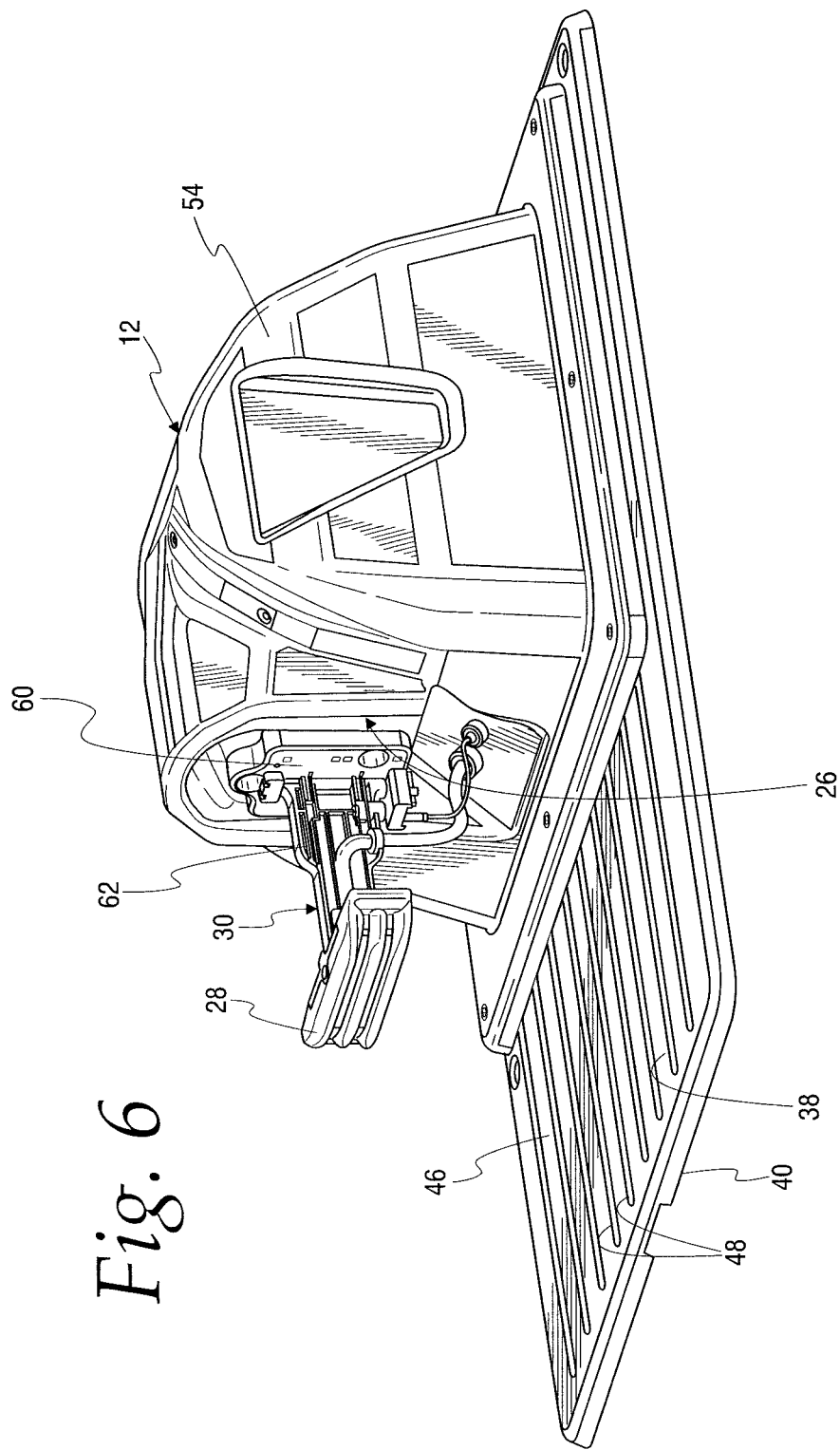
FIG. 6 is a perspective view of the components in FIG. 5, absent the mower.
Figure 7:
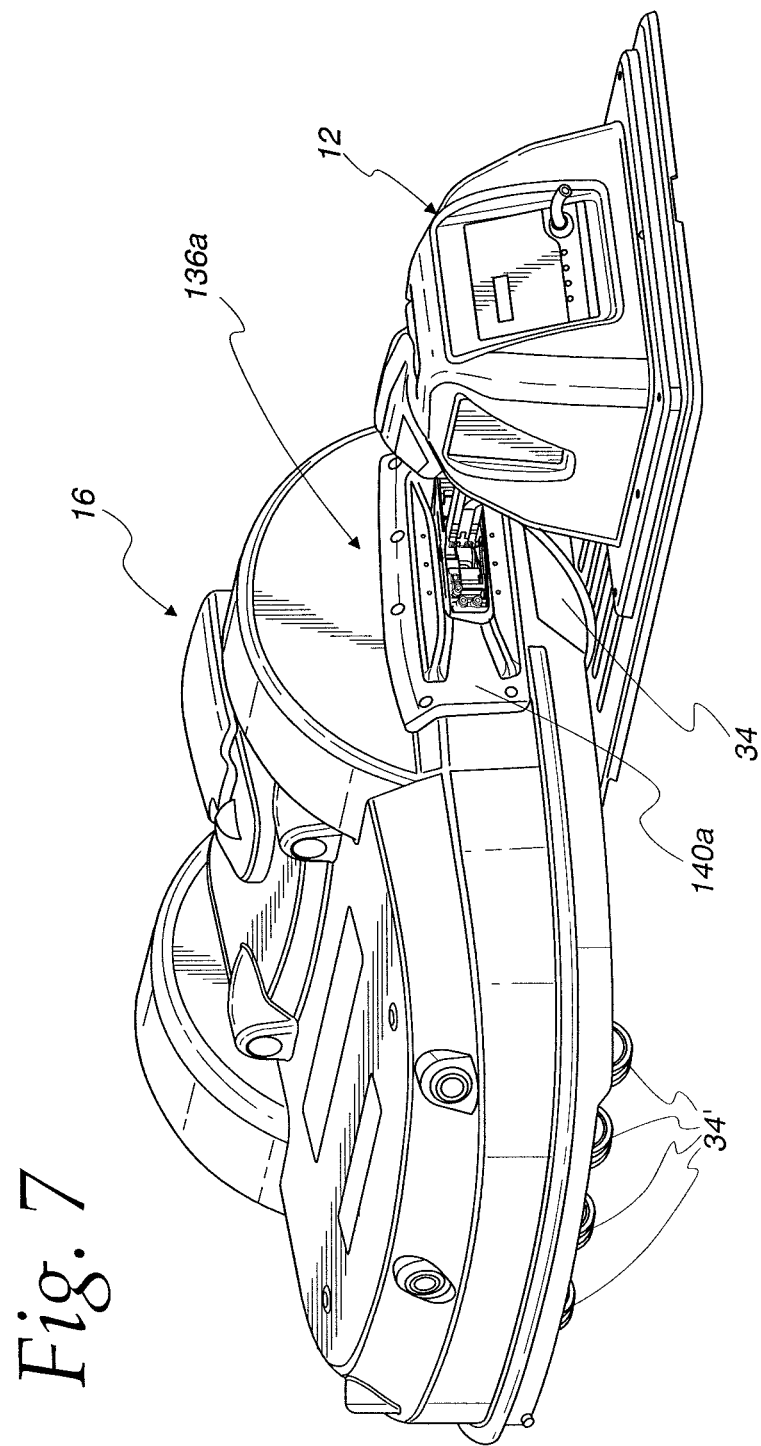
FIG. 7 is a view of the components in FIG. 5 from a different perspective.
Figure 8:
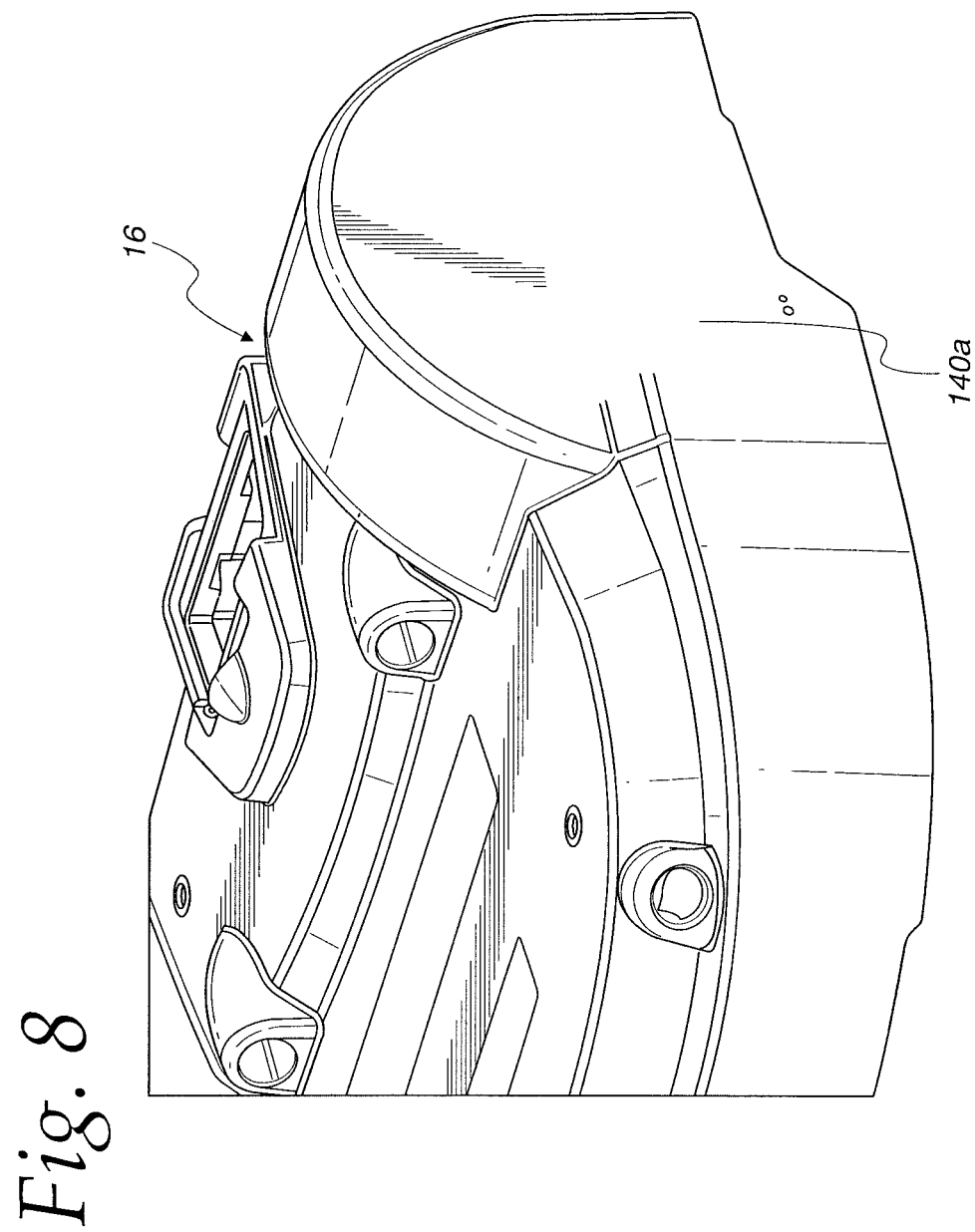
FIG. 8 is an enlarged, fragmentary, perspective view of a part of the mower in FIGS. 5 and 7, including a connector assembly thereon.
Figure 9:
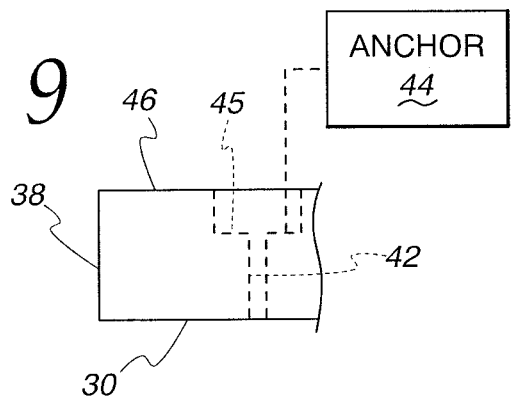
FIG. 9 is an enlarged, fragmentary, elevation view of a platform associated with the charging station in FIGS. 5-7.
Figure 10:
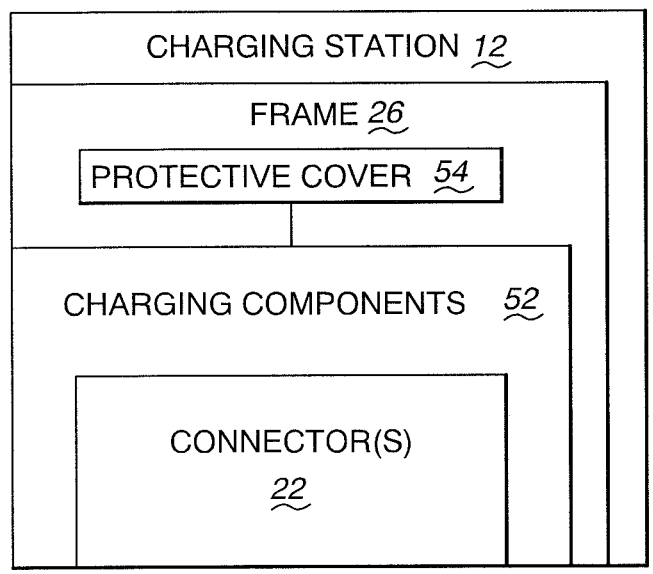
FIG. 10 is a schematic representation of the charging station in FIG. 1 and showing additional details thereof.

In FIG. 1, an adjustable system is shown schematically at 10 for facilitating establishment of an operative connection between a charging station 12 and a rechargeable power supply 14 on an apparatus/operating unit 16 that is propelled by a drive 18, powered by the rechargeable power supply 14.

The operating unit 16 may take virtually an unlimited number of different forms. The operating unit 16 may be manually repositioned by a user. In a preferred form, as described in detail hereinbelow, the operating unit 16 is propelled by the drive 18 to move in a controlled manner over a subjacent surface. The schematic showing in FIG. 1 is intended to encompass all such different forms.

The adjustable system 10 consists of an arm assembly 20 on the charging station 12 that supports at least one connector 22.

At least one connector 24 is provided on the operating unit 16.

The connectors 22, 24 are configured to cooperate with each other and establish an operative connection between the charging station 12 and the operating unit 16 with the connectors 22, 24 in an engaged relationship. With the connectors 22, 24 in the engaged relationship, the charging station 12 and rechargeable power supply 14 are operatively connected, such that the charging station 12 can be operated to effect charging of the rechargeable power supply 14.

While the arm assembly 20 is shown on the charging station 12, a like arm assembly 10' may be provided on the operating unit 16', as shown in FIG. 2. The arm assembly 10' supports at least one connector 24' that performs the function of the connector 24 in terms of operatively connecting the charging station 12 to a rechargeable power supply 14' associated with the drive 18' on the operating unit 16'.

In other words, a similarly functioning arm assembly may be provided on either the charging station 12 or the operating unit 16, with the alternative arrangements involving simply reversal of elements. Still further, cooperating arm assemblies might be provided, one each on the charging station 12 and operating unit 16.

For purposes of simplicity, the arm assembly 20 will be described as incorporated into the charging station 12, with it being understood that the same or a different arm assembly construction on the operating unit 16 is contemplated.

As shown in FIG. 3, the arm assembly 20 is mounted to a frame 26 on the charging station 12. It should be noted that the arm assembly 20 might be considered part of the charging station 12 as shown in FIG. 1 or as an assembly attached thereto, as shown in FIG. 3. For purposes of simplicity in the description and claims herein, these two versions will be considered to be the same construction.

In its most general form, the arm assembly 20 has a part 28 that supports the at least one connector 22, with the part 28 maintained on the frame 26 through a connection 30. The connection 30 is configured so that the at least one connector 22 can move in at least two dimensions relative to the frame 26 to thereby align the at least one connector 22 with the at least one connector 24 on the operating unit 16 to allow the connectors 22, 24 to assume their engaged relationship, as an incident of the operating unit 16 moving from a position spaced fully from the charging station 12 into a charging position.

The connection 30 may take an unlimited number of different forms that allow the multi-dimensional movement of the at least one connector 22 relative to the frame 26 contemplated. One exemplary form of the components shown in FIG. 1 will now be described.

As shown in FIGS. 5-26, the exemplary operating unit 16 is a "robotic" grass mower. It is not necessary to understand the details of the basic function of the operating unit/mower 16. It suffices to say that the operating unit/mower 16, as shown schematically in FIG. 4, has a frame 32 with one or more wheels 34 that support the frame 32 on a subjacent surface and act thereagainst to guide movement of the mower 12. The frame 32 supports the drive 18 and the rechargeable power supply 14 with the connector(s) 24.

One or more conventional cutting components 35 on the frame 32 are operated independently or through the drive 18. The cutting component(s) 35 may be in the form of one or more sharp blades that rotate or reciprocate, a moving flexible line, etc. There is no limitation as to the form or number of the cutting component(s) 35 that might be mounted on the frame 32.

A processor 36 may be pre-programmed to operate the drive 18 in a predetermined manner to control movement of the mower 12. Alternatively, the processor 36 may process dedicated external signals or may be GPS connected.

As shown in FIG. 5, the operating unit/mower 16 has a front F, a rear/back B, a right side R and a left side L. The frame support consists of separate wheels 34 adjacent the rear of the operating unit/mower 16—one each at the left and right side thereof.

At the front of the operating unit/mower 16 there are four steerable wheels 34' which can be repositioned to control directional movement of the operating unit/mower 16.

The charging station 12 has the aforementioned frame 26 which supports and houses the operating components therefor. The frame 26 incorporates a platform 38 with a generally flat underside surface 40 that can be placed against an underlying surface at a location where the operating unit/mower 16 is to be docked and charged. Use of the platform 38 is preferred but not required. The platform 38 has a plurality of openings 42 therethrough, each with a stepped diameter to accommodate an anchor 44 that can be directed into the underlying terrain. A part of the anchor 44 bears against a recessed, upwardly facing surface 45 at each opening location to maintain the platform 48 in place.

As noted above, the frame 26, and the associated charging station components, might be either temporarily or permanently mounted at a desired location.

An upper surface 46 of the platform 38 has a plurality of spaced, parallel, upwardly projecting ribs 48. The lengths of the ribs 48 are substantially orthogonal to a travel path of the operating unit/mower 16, as indicated by the double-headed arrow 50, as it moves to and from the charging station 12 and into and out of the aforementioned charging position. One exemplary charging position is shown in FIG. 5. The ribs 48 provide traction for one of the wheels 34 as the operating unit/mower 16 moves into and out of the FIG. 5 position, and a different charging position, as hereinafter described.

While it is not necessary to understand the structural details of the operating unit/mower 16, it is likewise not important to understand the details of the basic operating components on the charging station 12. It suffices to say that, as shown schematically in FIG. 10, the frame 26 supports conventional-type charging components, identified generically at 52, that will recharge a conventional-type power supply 14 once an electrical connection is made between the at least one connector 22 associated with the charging components 52 and supported by the arm assembly 20, and the at least one connector 24 on the rechargeable power supply 14.

The frame 26 also includes a protective cover 54 that shields the charging components 52 from the outside elements, blocks unauthorized access to the charging components 52, and contributes to the overall aesthetics of the charging station 12.

The frame 26 includes an arm base 56. A support assembly 58 is defined by the connection 30 and part 28.

In the embodiment depicted, the support assembly 58 is made up of three separate arm parts—a first arm part 60, a second arm part 62, and the arm part 28, which will be designated hereinafter as the third arm part.

In this embodiment, the frame 26 includes a backing plate 64 that is mounted to an angled surface 66 on the frame 26 to provide a draft space for the docked operating unit/mower 16 from which the joined arm parts 60, 62, 28 project in cantilever fashion. The arm base 56 has a wedge-shaped body 68 that is secured against the backing plate 64 so that a plane of an exposed, flat surface 70 on the body 68 is substantially vertically oriented. The body 68 is secured to the frame through fasteners 72 that each bears against a recessed surface 74 (one shown) to fix the arm base 56 against the backing plate 64. Each surface 74 extends around a vertically elongate slot 76 through which the fasteners 72 extend. This construction allows the vertical position of the arm base 56 relative to the backing plate 64 to be varied and the arm base 56 to be maintained in a desired vertical relationship by tightening the fasteners 72.

At least one deformable component, and in this case multiple coil springs 78, connect between the arm base 56 and the first arm part 60 to maintain the support assembly 58 in a neutral state. This allows a biasably controlled universal movement of the connectors 22a, 22b relative to the arm base 56.

Figure 14:
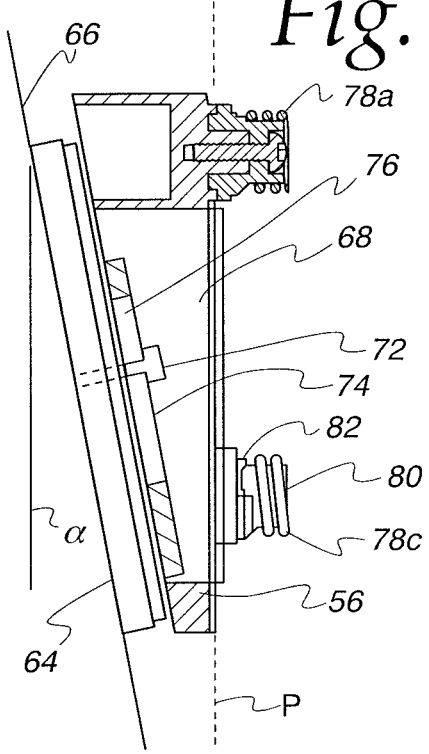
FIG. 14 is an enlarged, side elevation view of the components in FIG. 13, shown partially in cross-section.
Figure 16:
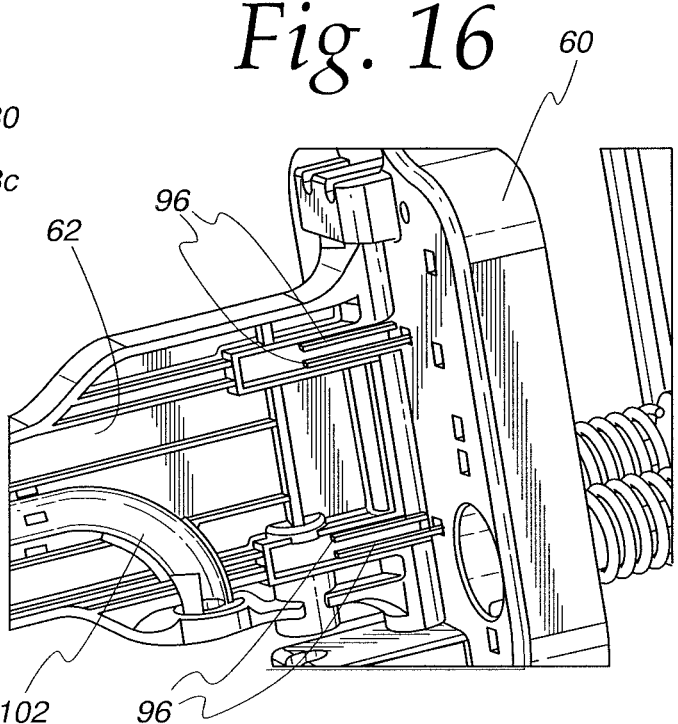
FIG. 16 is an enlarged, fragmentary, perspective view of a connection region between two arm parts on the inventive arm assembly.

While not a requirement, three coil springs 78a, 78b, 78c connect between the arm base 56 and the first arm part 60. The opposite ends of each coil spring 78 are fixed, one each to the arm base 56 and the first arm part 60. The end 80 of the one exemplary coil spring 78c in FIG. 14 is connected to the arm base 56 through a conventional mounting stub shaft 82 that has an outer surface which conforms to and is positively embraced by the inside of the surrounding turns of the spring 78b. All other coil spring ends are connected in a like fashion to their respective shaft component.

Figure 13:
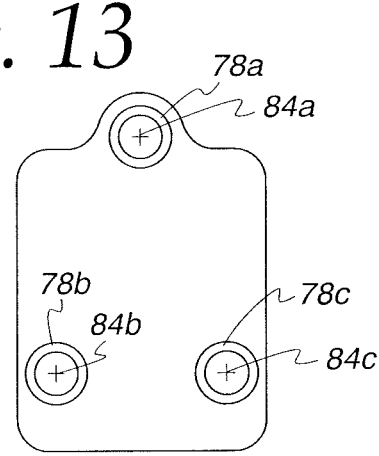
FIG. 13 is an elevation view of a mounting structure for a first arm part of an arm assembly as shown schematically in FIG. 1.
Figure 15:
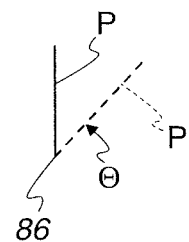
FIG. 15 is a schematic representation of angular movement permitted for the arm part supported by the spring arrangement of FIG. 13.
Figure 11:
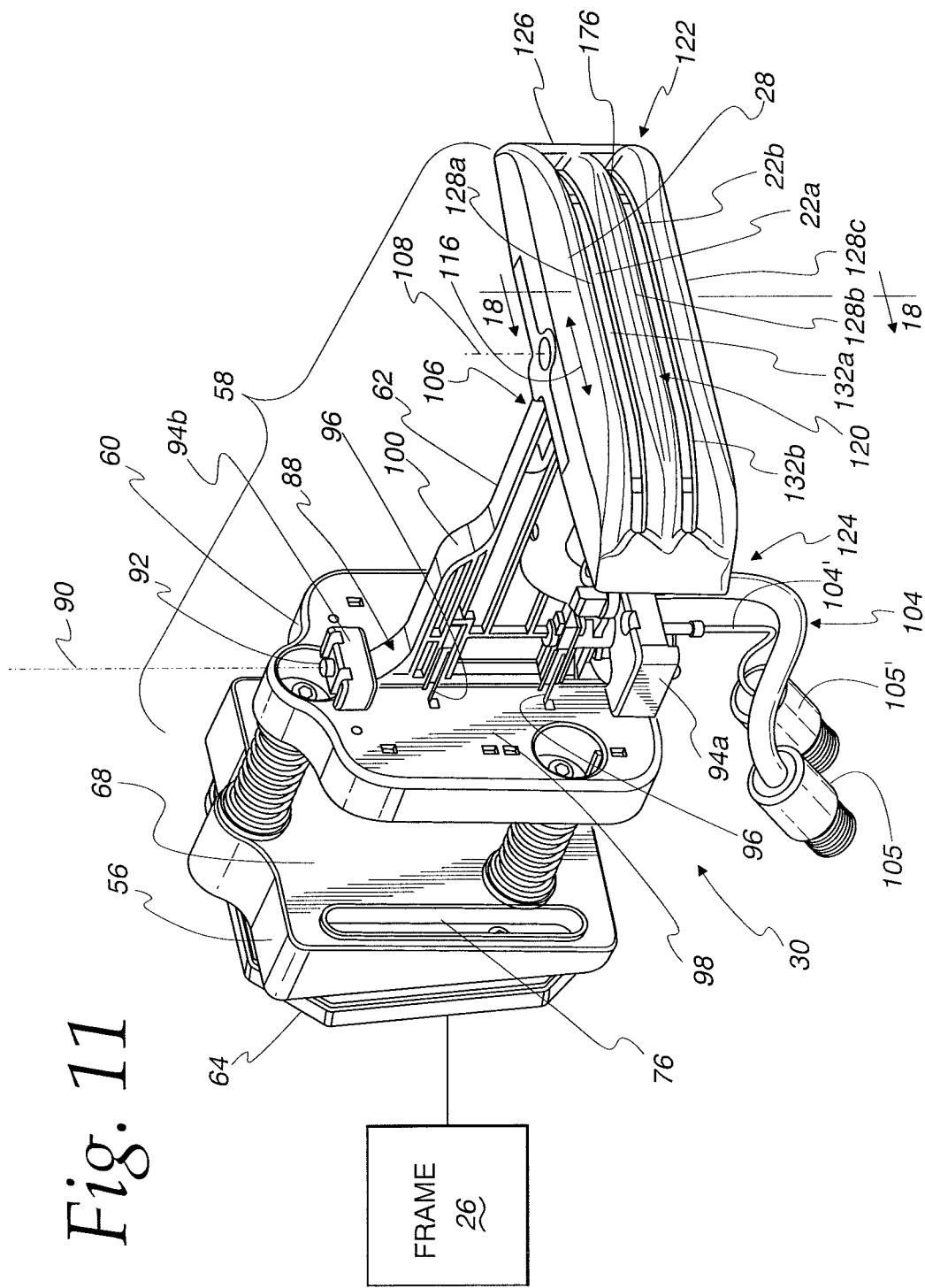
FIG. 11 is an enlarged, partially schematic, perspective view of the adjustable system for facilitating connection between the charging station and apparatus/operating unit on a frame of the charging station, as shown in FIGS. 5-7.

As shown most clearly in FIG. 13, the coil springs 78 are arranged in a pattern wherein the axes 84a, 84b, 84c of the springs 78*a*, 78*b*, 78*c*, successively, are substantially parallel to each other. The axes 84*b*, 84*c* are substantially at the same height with the axis 84*a* above the axes 84*b*, 84*c*, and substantially midway therebetween.

With this arrangement, a modicum of universal movement between the arm base 56 and first arm part 60 is allowed. The three spring arrangement allows tipping of the plane P of the surface 70 from a neutral position, as shown in solid lines in FIG. 15, to a dotted line position through an angle θ. A three spring arrangement, as depicted, primarily allows this tipping of the plane P potentially without appreciably changing the effective location at 86 where the plane pivots in FIG. 12.

The second arm 62 has a proximal end 88 pivotably connected for movement relative to the first arm part 60 around a vertically extending axis 90. A pivot pin 92 extends through the proximal arm end 88 and is supported at spaced locations by bosses 94*a*, 94*b* on the first arm part 60.

Figure 17:
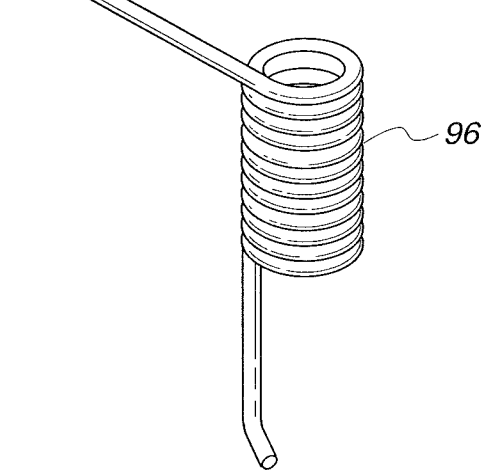
FIG. 17 is an enlarged, perspective view of a torsion coil spring used in the connection in FIG. 16.
Figure 18:
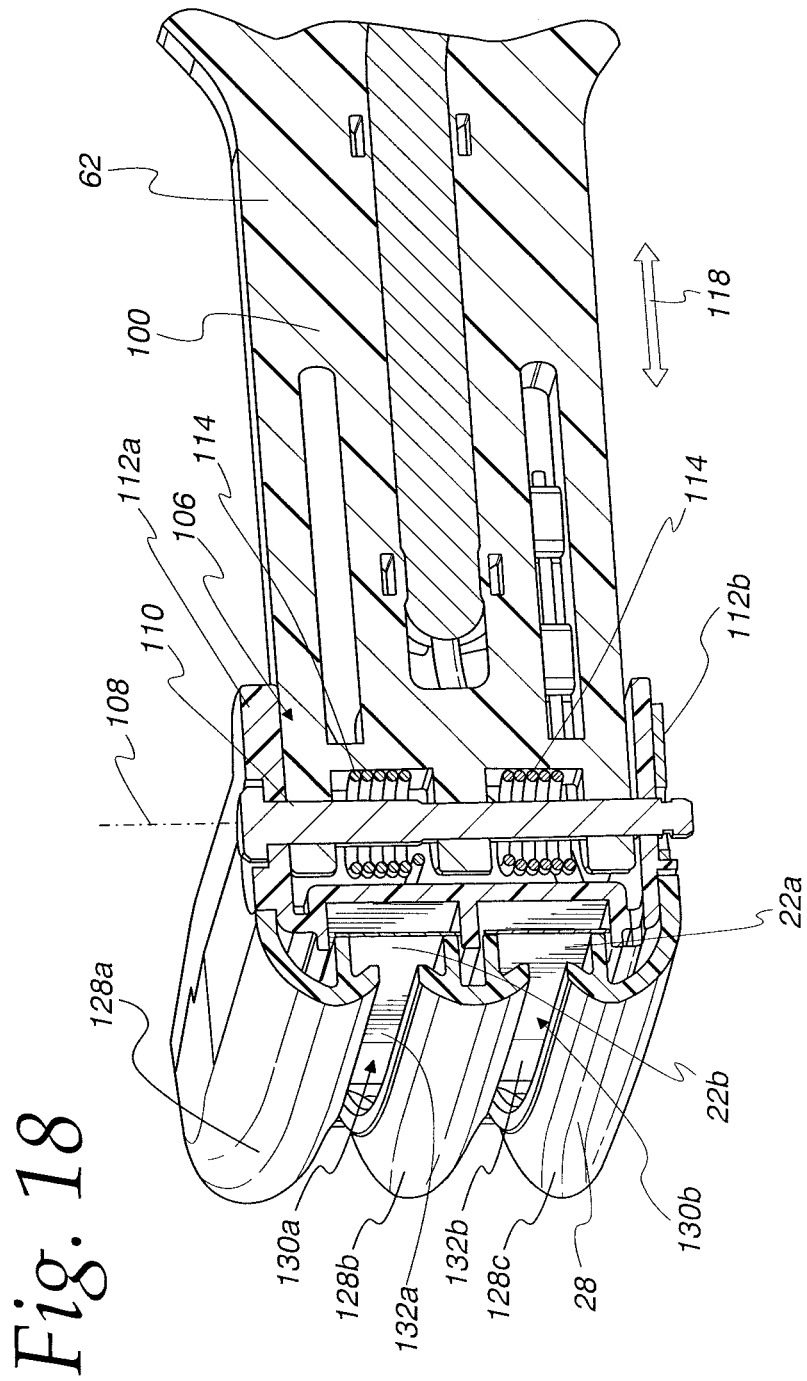
FIG. 18 is an enlarged, fragmentary, cross-sectional view of a part of the arm assembly taken along line 18-18 of FIG. 11.
Figure 19:
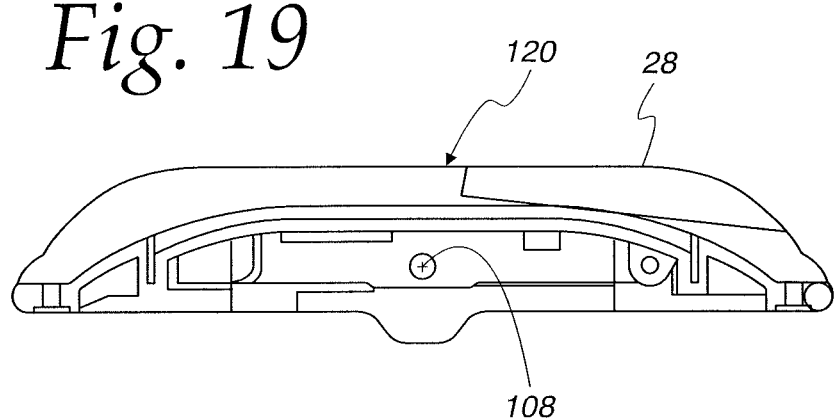
FIG. 19 is an enlarged, cross-sectional, plan view of an arm part supporting connectors on the arm assembly in FIG. 11.

A plurality of torsion springs 96, as shown in detail in FIG. 17, surround the pivot pin 92 along its length and are loaded between the first arm part 60 and second arm part 62. The springs 96 generate separate biasing forces that urge the second arm part 62 in opposite directions around the axis 90. The opposite forces balance each other to maintain the second arm part 62 in a neutral position wherein the length thereof projects substantially orthogonally to a planar horizontal surface 98 on the first arm part 60. The combination of springs 96 produces the same resistance to movement of the second arm part 62 in opposite directions from the neutral position.

The second arm part 62 has a body 100 with a generally flat shape that is molded to define a receptacle 102 for at least one wire bundle 104 that has conductors with an end connector fitting 105 mechanically joinable to the frame 26 to thereby electrically connect between the connectors 22*a*, 22*b* and the charging components 52 on the charging station 12. A second wire/wire bundle 104' extends from the second arm part 62 and has a connector fitting 105'.

The third arm part 28 is connected to the distal end 106 of the second arm part 62 for pivoting movement relative thereto around a vertically extending axis 108. A pivot pin 110 extends through the distal end 106 of the second arm part 62 and spaced walls 112*a*, 112*b* on the third arm part 28 between which the distal end 106 resides. Separate torsion springs 114 surround the pivot pin 110 and are loaded between the second and third arm parts 62, 28 to load the third arm part 28 into a neutral position relative to the second arm part 62 wherein a length of the third arm part 28, indicated by the double-headed arrow 116, is substantially orthogonal to the length of the second arm part 62, indicated by the double-headed arrow 118.

The torsion spring arrangement generates equal opposite forces that biasably resist pivoting of each of the second and third arm parts 62, 28 in either direction around its respective pivot axis 90, 108 from a neutral starting position.

The third arm part 28 has a body 126 with an exposed distal region 120 of the body 126 having an overall convex shape both between its lengthwise ends 122, 124 and from top to bottom. The body 126 is shaped to define three elongate rails 128*a*, 128*b*, 128*c*. Each rail 128 extends substantially the full dimension between the ends 122, 124 and follows the convex curvature of the region 120.

Between the upper rail 128*a* and middle rail 128*b*, an upper elongate slot 130*a* is defined, with a corresponding elongate lower slot 130*b* defined between the middle rail 128*b* and the lower rail 128*c*.

The connectors 22*a*, 22*b* each is in the form of a deformable leaf spring with elongate contact surfaces 132*a*, 132*b* recessed from the region 120 within the slots 130*a*, 130*b*, respectively. The leaf springs are loaded by being bent into a bulged shape. The leaf spring shapes are matched nominally to the curvature of the region 120 and extend over a majority of the length of the body 126 between the ends 122, 124.

While not a requirement, this depicted embodiment allows the operating unit/mower 16 to be moved from first and second different starting positions, each fully separated from the charging station 12, in two different path portions up to the charging position. As depicted, there are actually two different charging positions that result.

More particularly, the operating unit/mower 16 is shown in a first charging position resulting with the operating unit/mower 16 advanced, from the dotted line position at the bottom of FIG. 5 from a first starting position, in the direction of the arrow 134 in a first path portion up to the solid line first charging position in that Figure. This causes the connectors 24 on a first connector assembly 136*a*, at the rear portion of the left side L of the operating unit/mower 16, to cooperate with the connectors 22*a*, 22*b* to establish an operative connection between the charging station 12 and the operating unit/mower 16. A similarly constructed connector assembly 136*b* is provided on the right side of the operating unit/mower 16 and has connectors 24 that cooperate with the connectors 22*a*, 22*b* in the same manner as the connector assembly 136*a*.

The connector assembly 136*b* becomes the operative connector assembly with the mower unit turned through 180° around a vertical axis from the solid line position in FIG. 5 and advanced from the dotted line position at the top of FIG. 5, representing a second starting position, in the direction of the arrow 138—oppositely to the direction indicated by the arrow 134—in a second path portion up to a second charging position.

The connector assemblies 136*a*, 136*b* have essentially the same construction and cooperate with the arm assembly 20 in the same manner, with the exception that some parts are reversed to take into account the opposite direction moved by the operating unit/mower 16 into its charging position.

The arm assembly 20 is effectively bidirectional in that it cooperates with the connector assemblies 136*a*, 136*b* in substantially the same manner as the operating unit/mower 16 is advanced in opposite directions into the charging position.

More specifically, each of the connector assemblies 136*a*, 136*b* is built around a housing 140*a*, 140*b* that may be attached as a unit to the outer case 142 of the operating unit/mower 16 or may be integral with an underlying frame 144.

The exemplary connector assembly 136*b*, as shown in detail in FIGS. 21-25, supports connectors 24*a*, 24*b* that respectively cooperate with the connectors 20*a*, 20*b*.

Each connector 24*a*, 24*b* has the same construction. Each connector 24*a*, 24*b* is made from a flat conductive plate material with a perimeter shape as seen most clearly for the connector 24*b* in FIG. 25. Ignoring thickness, each flat plate can be considered to reside in a plane.

The housing 140*b* has an inside 146 that conforms at least nominally to the outer case 142 and can be releasably maintained thereagainst by one or more fasteners 148, acting between the housing 140*b* and the case 142.

The housing 140*b* has an outside 150 that is exposed to cooperate with the arm assembly 20.

The housing 140*b* has upper and lower projections 152*a*, 152*b*, respectively defining curved guide surfaces 154*a*, 154*b* that cooperatively produce an hourglass shape from a lateral perspective. The shape defines a leading funneling region 156*a* and a trailing funneling region 156*b* between which a rectangularly-shaped region 158 is defined within which the contacts 24*a*, 24*b* reside.

The height H of the body 126 of the third arm part 28 is slightly less than the dimension H1 between the guide surfaces 154*a*, 154*b* at the entry to the region 158.

As the operating unit/mower 16 is advanced downwardly in the direction of the arrow 138 from the dotted line position at the top of FIG. 5, the curved leading end 122 on the third arm part 28 engages the housing 140*b* at the leading funneling region 156*a*, which guides the third arm part 28 progressively to and along a distance through the region 158, whereupon the connectors 24*a*, 24*b* make operational electrical contact with the connectors 22*a*, 22*b*, respectively.

Because the connectors 24*a*, 24*b* each has a flat blade/vane shape that projects away from the outside 150 of the housing 140, they also guide relative movement between the connector assembly 136*b* and the third arm part 28 by sliding guidingly between the rails 128*a*, 128*b*, 128*c*, bounding the slots 130*a*, 130*b*.

More particularly, the connector 24*a* moves guidingly between the rails 128*a*, 128*b*, with the connector 24 moving guidingly between the rails 128*b*, 128*c*. To allow this to occur, the planes of the connectors 24*a*, 24*b* align with the length of a respective slot 130*a*, 130*b*. Generally, the line at each slot resides within the plane of its cooperating connector shape, or is generally parallel thereto.

To facilitate this interaction, all of the rails 128 have a convex shape with the width W of the third arm part tapering towards each of the ends 122, 124.

The overall cooperating housing surface area at 160, within the hourglass shape, is smoothly curved and complementary to the shape of the third arm part surface portions that engage therewith as the third arm part 28 slides guidingly against the housing 140*b*.

Additional stabilized guiding is afforded by providing separate flat guide vanes/blades 162*a*, projecting in the same direction as the connector 24*a*, in a straddling relationship with the connector 24*a*, and residing in a plane that intersects the connector 24*a*, with a separate pair of flat guide blades/vanes 162*b* having the same relationship with the connector 24*b*.

The blades 162 cooperate with the slots 130*a*, 130*b* as do the connectors 24*a*, 24*b* and thus perform a redundant guiding function, stabilize the relationship between the third arm part 28 and the connector assembly 136 including when the connectors 22, 24 are operatively connected, and additionally shield against access to the region where the connectors 22*a*, 24*a*; 22*b*, 24*b* are engaged. The blades preferably are non-conductors to perform the shielding function but could be made from a conductive material to allow them to enlarge the electrical contact region between the connectors 22, 24.

To assure that positive engagement between the connectors 22, 24 is made and maintained, the connectors 24*a*, 24*b* each is spring loaded.

Exemplary connector 24*b* has a body 164*b* with a straight electrical contact edge 166*b*. A straight actuating edge 168*b* extends at an angle to the contact edge 166*b*, which angle is shown to be slightly greater than 90° but is not required to be such.

The body 164 is maintained on the housing 140 through a mounting pin 170 which guides movement of the body 164*b* around an axis 172. A torsion coil spring 174 normally biases the body 164 to the dotted line position in FIG. 25, which represents a neutral, starting position therefor. This places the actuating edge 168*b* in a position whereby it will intercept the end region 122 of the third body part 28 in alignment with the slot 132*b* as the operating unit 16 is moved towards the charging position.

Figure 25:
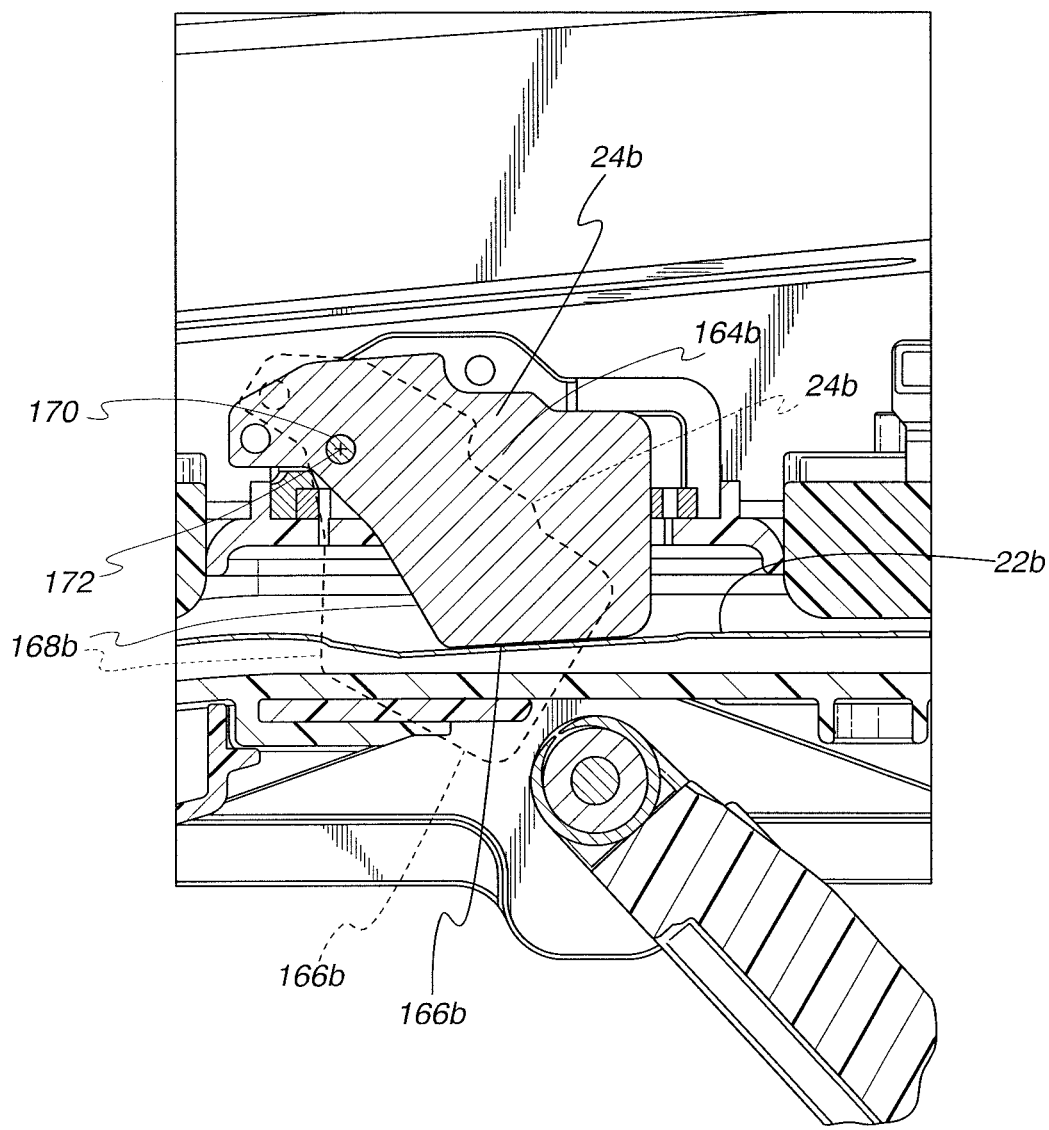
FIG. 25 is an enlarged, fragmentary, bottom view of the inventive adjustable system partially in cross section and with connectors on the charging station and mower engaged.

A ramp region 176 on the body 126 of the third arm part 28 progressively cams the body 164*b* from the starting dotted line position of FIG. 25 towards the solid line position in that same Figure. At the same time, the actuating edge 168*b* engages the convex surface on the bulged leaf spring/connector 22*b* and progressively deforms the leaf spring until the surface thereon is conformed to and in contact with substantially the entire length of the contact edge 166*b* with the operating unit/mower 16 in the charging position, as shown in FIG. 25. Thus, a substantial, elongate contact region may be established for positive electrical connection.

The connector 24*a* cooperates with the connector 22*a* in the same manner.

The discrete, different edge shapes are not required. For example, a continuously curved shape, or other shapes, might be utilized. These different shapes might be selected so that a single charging position might be realized by advancing the operating unit in the same orientation in opposite directions. Alternatively, the connectors 24*a*, 24*b* may be pivoted by movement of the operating unit/mower 16 in only a single direction.

Figure 23:
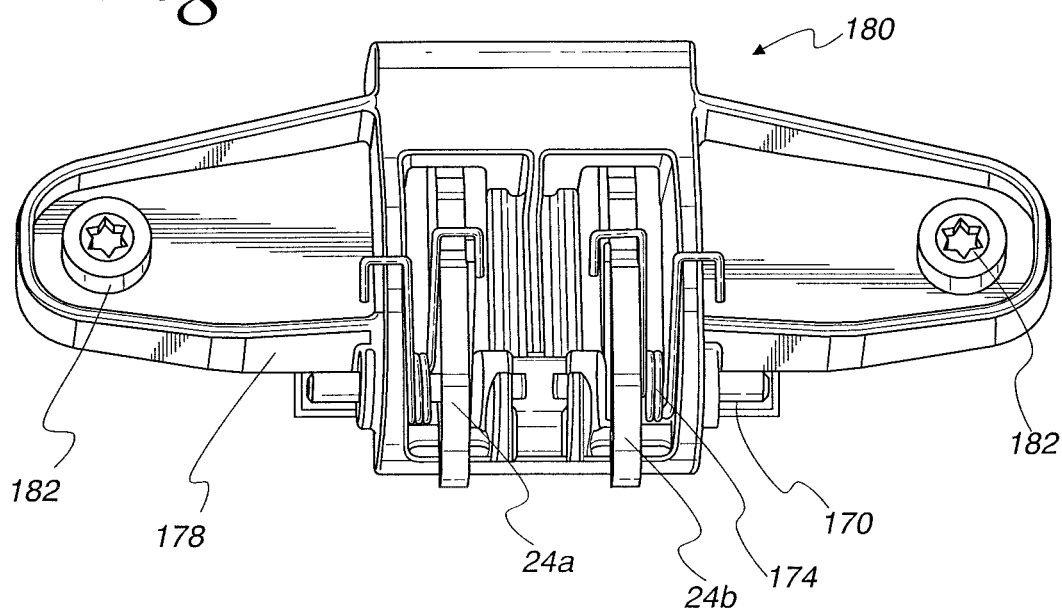
FIG. 23 is an enlarged, perspective view of a module that supports the connectors on the mower.
Figure 24:
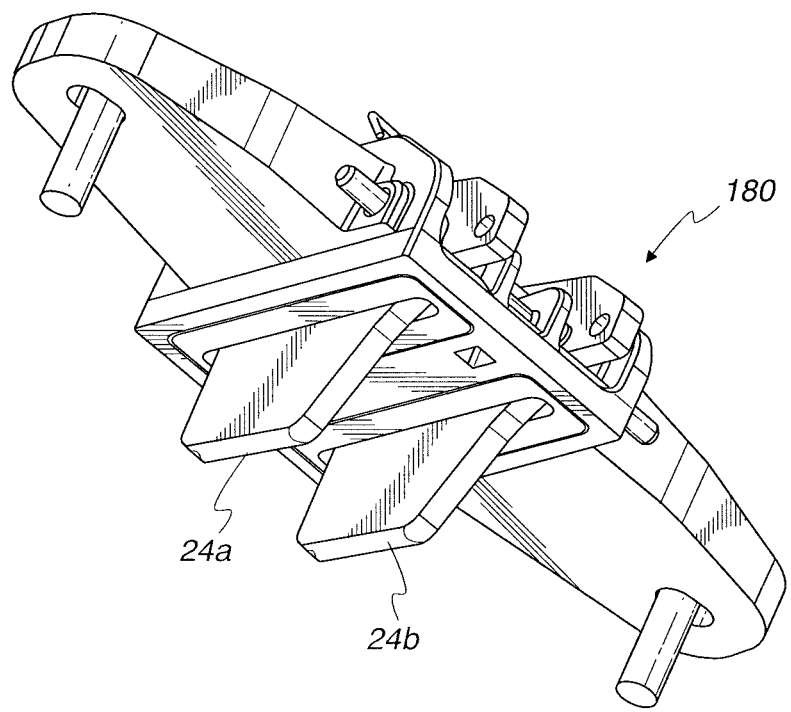
FIG. 24 is a view of the module in FIG. 23 from a different perspective.

In this embodiment, the connectors 24*a*, 24*b* are mounted to a frame 178 that supports the mounting pin 170 around which both connectors 24*a*, 24*b* pivot. As shown in FIGS. 23 and 24, a self-contained module at 180 is formed which is connectable as a unit to the remainder of the housing 140. Separate fasteners 182 effect the securement.

With the various structure as described above, potentially many advantages may be realized.

By reason of having the connectors 24 spring biased against deformed connectors 22 in a preloaded leaf spring form, a substantial electrical contact area can be maintained even though the operating unit/mower 16 may not be precisely aligned in its optimal programmed charging position. In other words, as an incident of the operating unit/mower 16 realizing the charging position, the connectors 22, 24 reposition in a manner that a residual loading force is generated that urges the connectors 22, 24 positively against each other. Positive electrical connection can thus be maintained.

As seen in FIG. 5, with the operating unit/mower 16 in its charging position, the second arm part 62 is moved against a torsional spring force through an angle $\theta 1$, that may be on the order of 30°, whereby a restoring force positively urges the connectors 22 against the connectors 24.

The pivoting force applied to the arm part 62 also loads the coil springs 78, which generates residual loading forces that urge the connectors 22 towards the connectors 24.

This resilient arm assembly construction allows the operating unit/mower 16 to move into and away from the charging station 12 without significant interference, even with a degree of deviation from an optimal lateral positioning of the operating unit/mower 16 in its charging position. The operating unit/mower 16 in the solid line position of FIG. 5 thus might move forwardly or rearwardly to disengage from the charging station 12.

The ability to shift the arm base 56 vertically with respect to the frame on the charging station 12 permits the connectors 22 to be precisely aligned with the path of the connectors 24 on the operating unit/mower 16 during initial setup and programming.

Figure 20:
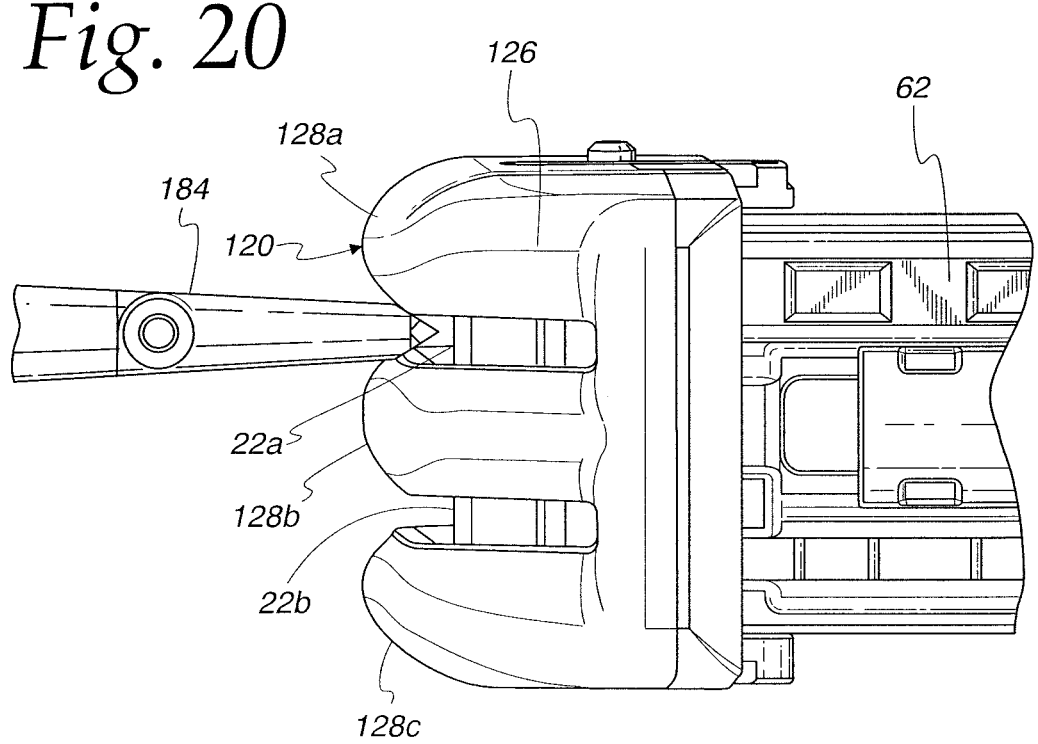
FIG. 20 is an enlarged, fragmentary view of a distal region of the inventive arm assembly with a probe being directed towards connectors thereon.
Figure 21:
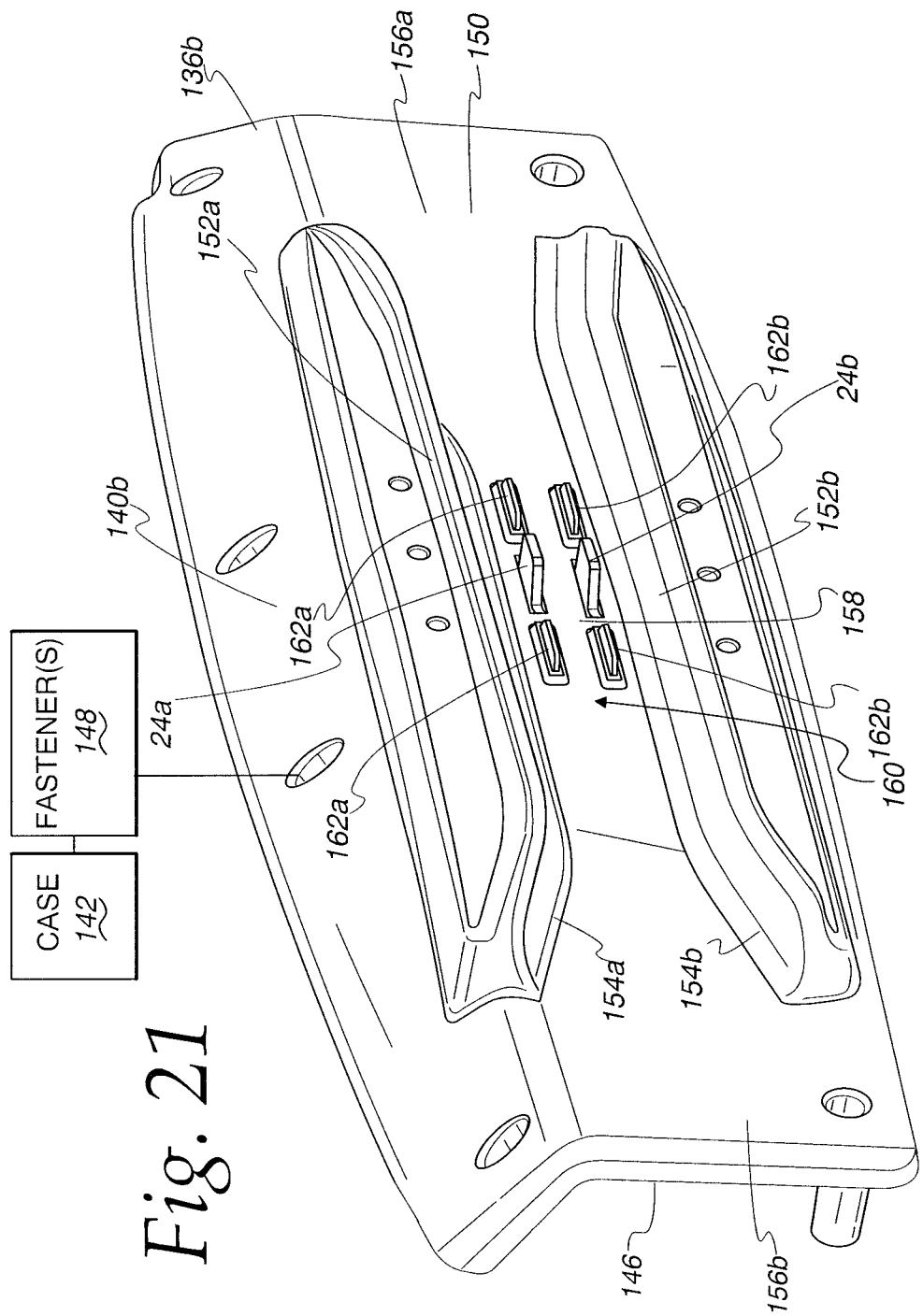
FIG. 21 is an enlarged, perspective view of a connector assembly for the apparatus/operating unit and making up part of the inventive adjustable system.
Figure 22:
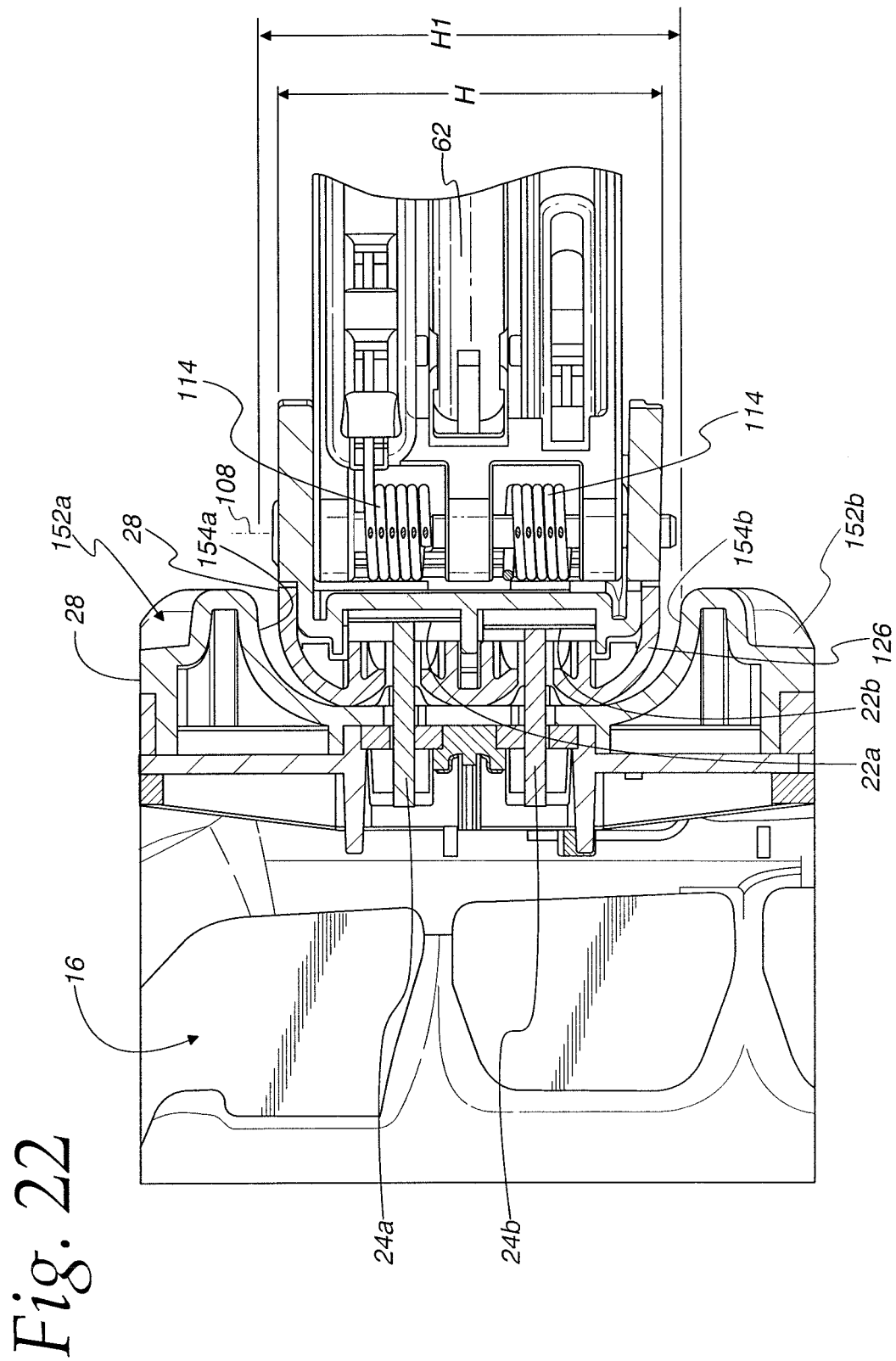
FIG. 22 is a view as in FIG. 18 with connectors on the arm assembly engaged with connectors on the mower on the charging station and mower engaged.

As shown at FIG. 20, by reason of recessing the connectors 24a, 24b between the rails 128 at the region 120, the resulting limited exposure of the contacts 24a, 24b puts the design in compliance with UL certification requirements that limit access by a probe 184.

Figure 26:
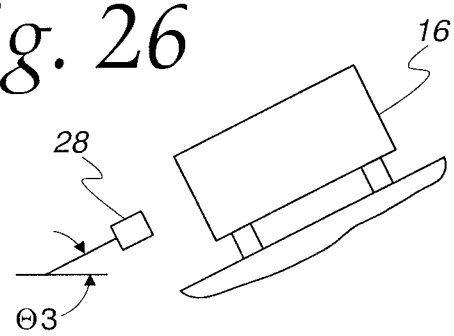
FIG. 26 is a schematic representation showing angular adjustment of an arm part on the inventive arm assembly in relationship to a mower supported on an incline.

The arrangement of the coil springs 78 allows an angular reorientation of the third housing part 28, as shown in FIG. 26, through an angle θ which will allow adequate engagement of the connectors 22, 24 with the operating unit/mower 16 inclined, as shown schematically therein.

The coil springs 78, together with the described relatively movable arm part arrangement, allow electrical connection between the charging station 12 and operating unit/mower 16 to be made with the operating unit/mower 16 skewed from its programmed or optimal charging position.

Any potential misalignment between the charging station 12 and operating unit/mower 16 may further be accommodated by the flat guide blades 162 that facilitate engagement of the connectors 22, 24 and stabilize the finally established operative relationship between the third arm part 28 and the connector assemblies 136.

Figure 27:
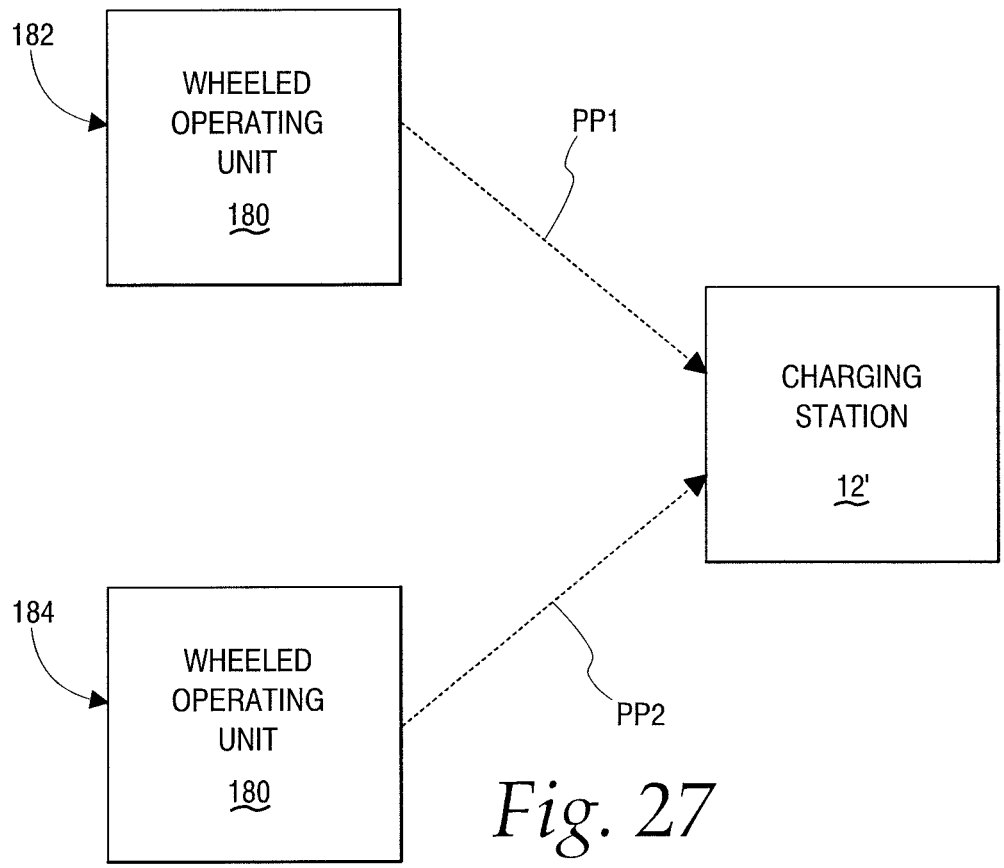
FIG. 27 is a schematic representation of a wheeled operating unit moving from two different starting positions into the same or different charging positions.

While FIG. 5 depicts the operating unit/mower 16 moving in two different path portions in directions indicated by the arrows 134, 138, into two different charging positions, as shown in FIG. 27, the invention contemplates a more generic design for any wheeled operating unit, designated 180 and not limited to the particular operating unit/mower 16 described, and a cooperating charging station 12'. In FIG. 27, the wheeled operating unit 180 is shown in a first starting position at 182 and a second starting position at 184. From the first starting position at 182, the wheeled operating unit 180 moves in a first path portion PP1 up to and into a charging position on the charging station. The wheeled operating unit 180 in the second position 184 moves in a second path portion PP2 into a charging position on the charging station 12'.

The components may be designed so that the wheeled operating unit 180 assumes the same charging position as it moves in each of the path portions PP1, PP2, or different charging positions, not limited to those shown in FIG. 5, upon traversing the path portions PP1, PP2.

Further, the generic showing in FIG. 27 encompasses the wheeled operating unit 180 moving in the same or different orientations into the charging position(s) along the different paths PP1, PP2. While multidirectional movement—typically forward or rearward—of the wheeled operating unit 180 into its charging position(s) is contemplated, the system would most commonly be designed so that the movement of the wheeled operating unit 180 along both path portions PP1, PP2 occurs with the same part of the wheeled operating unit 180 in a leading direction. For example, as shown in FIG. 5, the operating unit/mower 16 moves in a forward leading direction into both charging positions described.

Figure 28:
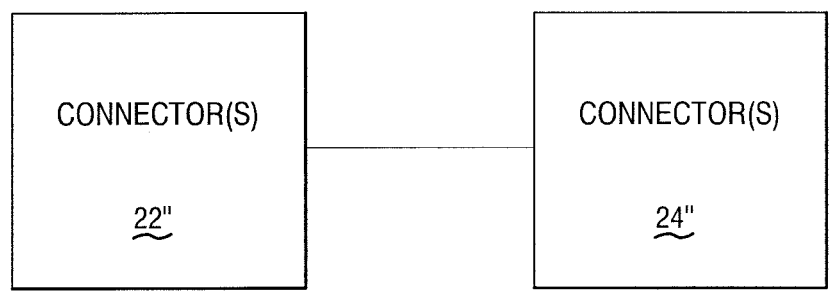
FIG. 28 is a generic representation of cooperating connectors on an operating unit and charging station.

In a further variation, as shown schematically in FIG. 28, connectors 22", 24", corresponding to the connectors 22, 24, respectively associated with the charging station 12 and apparatus/operating unit 16, may have a different construction which relies on a different type of engagement. For example, the connectors 22", 24" may have a plug-in arrangement whereas the aforementioned connectors 22, 24 are connected in such a manner that the apparatus/operating unit 16 can move in a single direction up to a charging position and continue in that same direction to disengage from the charging station 12. In other words, the generic representation of the structure shown in FIG. 27 encompasses a multitude of different structures that afford advantages, described above, without limitation to the preferred connecting arrangement shown in FIGS. 5-26.

As but one example, the same connectors on the wheeled operating unit 180 and the charging station 12' may assume the engaged relationship with the wheeled operating unit 180 advanced from the different starting positions 182, 184. This is a variation of the preferred embodiment wherein the connector assemblies 136a, 136b are spaced from each other—in the embodiment shown in a lateral direction.

The foregoing disclosure of specific embodiments is intended to be illustrative of the broad concepts comprehended by the invention.

The invention claimed is:

1. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:

an arm assembly on one of the charging station and the operating unit and supporting at least one connector;

at least one connector on the other of the charging station and the operating unit, the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply, wherein the operating unit is movable relative to the charging station from a position spaced fully from the charging station into a charging position wherein the at least one connector on the arm assembly and the at least one connector on the other of the charging station and the operating unit assume the engaged relationship, wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position, wherein the one of the charging station and the operating unit has a frame, wherein the adjustable system comprises an arm base on the frame and the arm assembly comprises a support assembly for the one connector on the arm assembly, wherein the support assembly is cantilever mounted to the arm base for movement in at least two dimensions relative to the arm base.

2. The adjustable system according to claim 1 wherein the support assembly is connected to the arm base through at least one deformable component that maintains the support assembly in a neutral state with no external forces applied to the support assembly and that deforms under a predetermined force applied to the support assembly to allow the one connector on the arm assembly to move in at least two dimensions relative to the arm base.

3. The adjustable system according to claim 2 wherein the at least one deformable component is a coil spring with axial ends connected one each to the arm base and the support assembly.

4. The adjustable system according to claim 2 wherein the support assembly comprises a first arm part, the at least one deformable component connecting between the first arm part and the arm base, and at least one other arm part spaced from the arm base and movable relative to the first arm part to allow the one connector on the arm assembly to move relative to the first arm part.

5. The adjustable system according to claim 4 wherein the at least one other arm part comprises a second arm part movable relative to the first arm part and a third arm part, spaced from the arm base on which the one connector on the arm assembly is supported in a manner to move relative to the second arm part.

6. The adjustable system according to claim 5 wherein the second arm part is movable relative to the first arm part around a first axis.

7. The adjustable system according to claim 6 wherein the third arm part is movable relative to the second arm part around a second axis.

8. The adjustable system according to claim 7 wherein the first and second axes are substantially parallel to each other.

9. The adjustable system according to claim 6 wherein the first and second arm parts are biased by a force acting between the first and second arm parts into a neutral relationship with respect to each other around the first axis.

10. The adjustable system according to claim 9 wherein second and third arm parts are biased by a force acting between the second and third arm parts into a neutral relationship with respect to each other around the second axis.

11. The adjustable system according to claim 1 wherein the operating unit is a wheeled unit with at least one cutting element for severing grass.

12. The adjustable system according to claim 1 wherein the arm assembly is on the charging station.

13. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:
an arm assembly on one of the charging station and the operating unit and supporting at least one connector;
at least one connector on the other of the charging station and the operating unit,
the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply,
wherein the operating unit is movable relative to the charging station from a position spaced fully from the charging station into a charging position wherein the at least one connector on the arm assembly and the at least one connector on the other of the charging station and the operating unit assume the engaged relationship,
wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position,
wherein the one of the charging station and the operating unit has a frame, the adjustable system comprises an arm base on the frame and the arm assembly comprises a support assembly for the one connector on the arm assembly, the support assembly connected to the arm base for universal movement relative to the arm base.

14. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:
an arm assembly on one of the charging station and the operating unit and supporting at least one connector;
at least one connector on the other of the charging station and the operating unit,
the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply,
wherein the operating unit is movable relative to the charging station from a position spaced fully from the charging station into a charging position wherein the at least one connector on the arm assembly and the at least one connector on the other of the charging station and the operating unit assume the engaged relationship,
wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position,
wherein the one of the charging station and the operating unit has a frame, the adjustable system comprises an arm base on the frame and the arm assembly comprises a support assembly for the one connector on the arm assembly, wherein the support assembly is connected to the arm base through at least one deformable component that maintains the support assembly in a neutral state with no external forces applied to the support assembly and that deforms under a predetermined force applied to the support assembly to allow the one connector on the arm assembly to move in at least two dimensions relative to the arm base, wherein the at least one deformable component is a coil spring with axial ends connected one each to the arm base and the support assembly, wherein the support assembly is supported on the arm base by only the at least one deformable component.

15. The adjustable system according to claim 14 wherein the at least one deformable component comprises at least three deformable components each with an axis, the axes of the three deformable components are substantially parallel, and the at least three deformable components comprise first and second deformable components spaced horizontally from each other and a third deformable component located above and horizontally between the first and second deformable components as viewed along the axes of the three deformable components.

16. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:

an arm assembly on one of the charging station and the operating unit and supporting at least one connector;

at least one connector on the other of the charging station and the operating unit, the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply, wherein the operating unit is movable relative to the charging station from a position spaced fully from the charging station into a charging position wherein the at least one connector on the arm assembly and the at least one connector on the other of the charging station and the operating unit assume the engaged relationship, wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position, wherein the one of the charging station and the operating unit has a frame, the adjustable system comprises an arm base on the frame and the arm assembly comprises a support assembly for the one connector on the arm assembly, wherein the support assembly is connected to the arm base through at least one deformable component that maintains the support assembly in a neutral state with no external forces applied to the support assembly and that deforms under a predetermined force applied to the support assembly to allow the one connector on the arm assembly to move in at least two dimensions relative to the arm base, wherein the support assembly comprises a first arm part, the at least one deformable component connecting between the first arm part and the arm base, and at least one other arm part movable relative to the first arm part to allow the one connector on the arm assembly to move relative to the first arm part, wherein the at least one other arm part comprises a second arm part movable relative to the first arm part and a third arm part, on which the one connector on the arm assembly is supported in a manner to move relative to the second arm part, wherein the second arm part is movable relative to the first arm part around a first axis, wherein the third arm part is movable relative to the second arm part around a second axis wherein the one deformable component is a coil spring with a third axis, the third axis extends in a substantially horizontal line and at least one of the first and second axes extends in a substantially vertical line.

17. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:

an arm assembly on one of the charging station and the operating unit and supporting at least one connector;

at least one connector on the other of the charging station and the operating unit, the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply, wherein the operating unit is movable relative to the charging station from a position spaced fully from the charging station into a charging position wherein the at least one connector on the arm assembly and the at least one connector on the other of the charging station and the operating unit assume the engaged relationship, wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position, wherein the one of the charging station and the operating unit has a frame, the adjustable system comprises an arm base on the frame and the arm assembly comprises a support assembly for the one connector on the arm assembly, wherein the support assembly connected to the arm base through at least one deformable component that maintains the support assembly in a neutral state with no external forces applied to the support assembly and that deforms under a predetermined force applied to the support assembly to allow the one connector on the arm assembly to move in at least two dimensions relative to the arm base, wherein the support assembly comprises a first arm part, the at least one deformable component connecting between the first arm part and the arm base, and at least one other arm part movable relative to the first arm part to allow the one connector on the arm assembly to move relative to the first arm part, wherein the at least one other arm part comprises a second arm part movable relative to the first arm part and a third arm part, on which the one connector on the arm assembly is supported in a manner to move relative to the second arm part, wherein the third arm part has an elongate slot with a length extending generally horizontally, the at least one connector on the arm assembly is located at least partially within the slot, and the one connector on the other of the charging station and the operating unit is configured to move guidingly along the length of the slot to engage the one connector on the arm assembly as an incident of the operating unit moving relative to the charging station from a position spaced from the charging station into the charging position.

18. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:

an arm assembly on one of the charging station and the operating unit and supporting at least one connector;

at least one connector on the other of the charging station and the operating unit, the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply, wherein the operating unit is movable relative to the charging station from a position spaced fully from the charging station into a charging position wherein the at least one connector on the arm assembly and the at least one connector on the other of the charging station and the operating unit assume the engaged relationship, wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position, wherein the one of the charging station and the operating unit has a frame, the adjustable system comprises an arm base on the frame and the arm assembly comprises a support assembly for the one connector on the arm assembly, the support assembly connected to the arm base for movement in at least two dimensions relative to the arm base, wherein the arm base is movable relative to the frame on the one of the charging station and the operating unit and fixable in a plurality of vertically spaced positions on the frame on the one of the charging station and the operating unit.

19. An adjustable system for facilitating establishment of an operative connection between a charging station and a rechargeable power supply on an operating unit that is propelled by a drive, powered by the rechargeable power supply, as to move in a controlled manner over a subjacent surface, the adjustable system comprising:

an arm assembly on one of the charging station and the operating unit and supporting at least one connector;

at least one connector on the other of the charging station and the operating unit, the at least one connector on the arm assembly and the at least one connector on the other of the charging station and the operating unit configured to cooperate and establish an operative connection between the charging station and the operating unit with the at least one connector on the arm assembly and the at least one connector on the other of the charging station and the operating unit in an engaged relationship wherein the charging station and rechargeable power supply are operatively connected and the charging station is operable to effect charging of the rechargeable power supply, wherein the operating unit is movable relative to the charging station from a position spaced fully from the charging station into a charging position wherein the at least one connector on the arm assembly and the at least one connector on the other of the charging station and the operating unit assume the engaged relationship, wherein the arm assembly is configured so that the at least one connector on the arm assembly can move in at least two dimensions relative to the one of the charging station and the operating unit to align with the at least one connector on the other of the arm assembly and the operating unit to allow the at least one connector on the arm assembly and the at least one connector on the other of the charging station and the operating unit to assume the engaged relationship as an incident of the operating unit moving from a position spaced fully from the charging station into the charging position, wherein the one of the charging station and the operating unit has a frame, the adjustable system comprises an arm base on the frame and the arm assembly comprises a support assembly for the one connector on the arm assembly, wherein the support assembly is connected to the arm base through at least one deformable component that maintains the support assembly in a neutral state with no external forces applied to the support assembly and that deforms under a predetermined force applied to the support assembly to allow the one connector on the arm assembly to move in at least two dimensions relative to the arm base, wherein the support assembly comprises a first arm part, the at least one deformable component connecting between the first arm part and the arm base, and at least one other arm part movable relative to the first arm part to allow the one connector on the arm assembly to move relative to the first arm part, wherein the at least one other arm part comprises a second arm part movable relative to the first arm part and a third arm part, on which the one connector on the arm assembly is supported in a manner to move relative to the second arm part, wherein the second arm part is movable relative to the first arm part around a first axis, wherein the third arm part is movable relative to the second arm part around a second axis, wherein the second arm part projects in cantilever fashion from the first arm part and the third arm part is supported entirely by the second arm part.

* * * * *